United States Patent [19]

Nakayama et al.

[11] Patent Number: 5,172,239
[45] Date of Patent: Dec. 15, 1992

[54] SIGNAL GENERATOR FOR GENERATING A CONTROL SIGNAL INCLUDING A REFERENCE SIGNAL AND SIGNAL SEPARATOR FOR SEPARATING THE REFERENCE SIGNAL FROM THE CONTROL SIGNAL

[75] Inventors: Tadanori Nakayama, Neyagawa; Hiroyuki Makuta, Kadoma, both of Japan

[73] Assignee: Matsushita Electric Industrial Co., Ltd., Osaka, Japan

[21] Appl. No.: 512,997

[22] Filed: Apr. 23, 1990

[30] Foreign Application Priority Data

Apr. 27, 1989 [JP] Japan ................................. 1-108863
Aug. 25, 1989 [JP] Japan ................................. 1-218802

[51] Int. Cl.$^5$ ............................................. H04N 9/79
[52] U.S. Cl. ................................. 358/310; 358/311; 360/10.3; 360/77.12; 360/77.13
[58] Field of Search ................... 360/10.2, 10.3, 77.12, 360/77.13; 358/311, 310, 335

[56] References Cited

U.S. PATENT DOCUMENTS 4,772,975 9/1988 Azuma ........................ 358/312 X

FOREIGN PATENT DOCUMENTS 59-174076 10/1984 Japan .
62-217454 9/1987 Japan .

OTHER PUBLICATIONS

Takeo Eguchi, "4:2: Digital VTR Format", The Journal of the Institute of Television Engineers of Japan, vol. 40, No. 6, pp. 457-467, 1986.
Atushi Kuninaga and others, "High Performance M VTRAU-660," National Technical Report, vol. 34, No. 6, pp. 89-96, Dec. 1988.
Selichi Hashimoto and others, "M 625/50 (PAL) Format VTR," National Technical Report, vol. 34, No. 6, pp. 97-103, Dec. 1988.

*Primary Examiner*—Robert L. Richardson
*Attorney, Agent, or Firm*—Stevens, Davis, Miller & Mosher

[57] ABSTRACT

A signal generator generates a control signal for use in tracking control of a VTR. The control signal is a composite signal including a reference signal and timing information of a frame signal and a color frame signal, which is formed by changing the duty ratio of the reference signal, having N times (where N is a natural number larger than 2) the frequency of the frame signal and a first duty ratio, to a second duty ratio at a predetermined position and to a third duty ratio at another position during the period of the color frame signal. A signal separator separates the frame signal and the color frame signal from the reproduced control signal by detecting the first or second duty ratio from the control signal, which is generated from the control signal generator, recorded on and reproduced from a video tape.

16 Claims, 18 Drawing Sheets

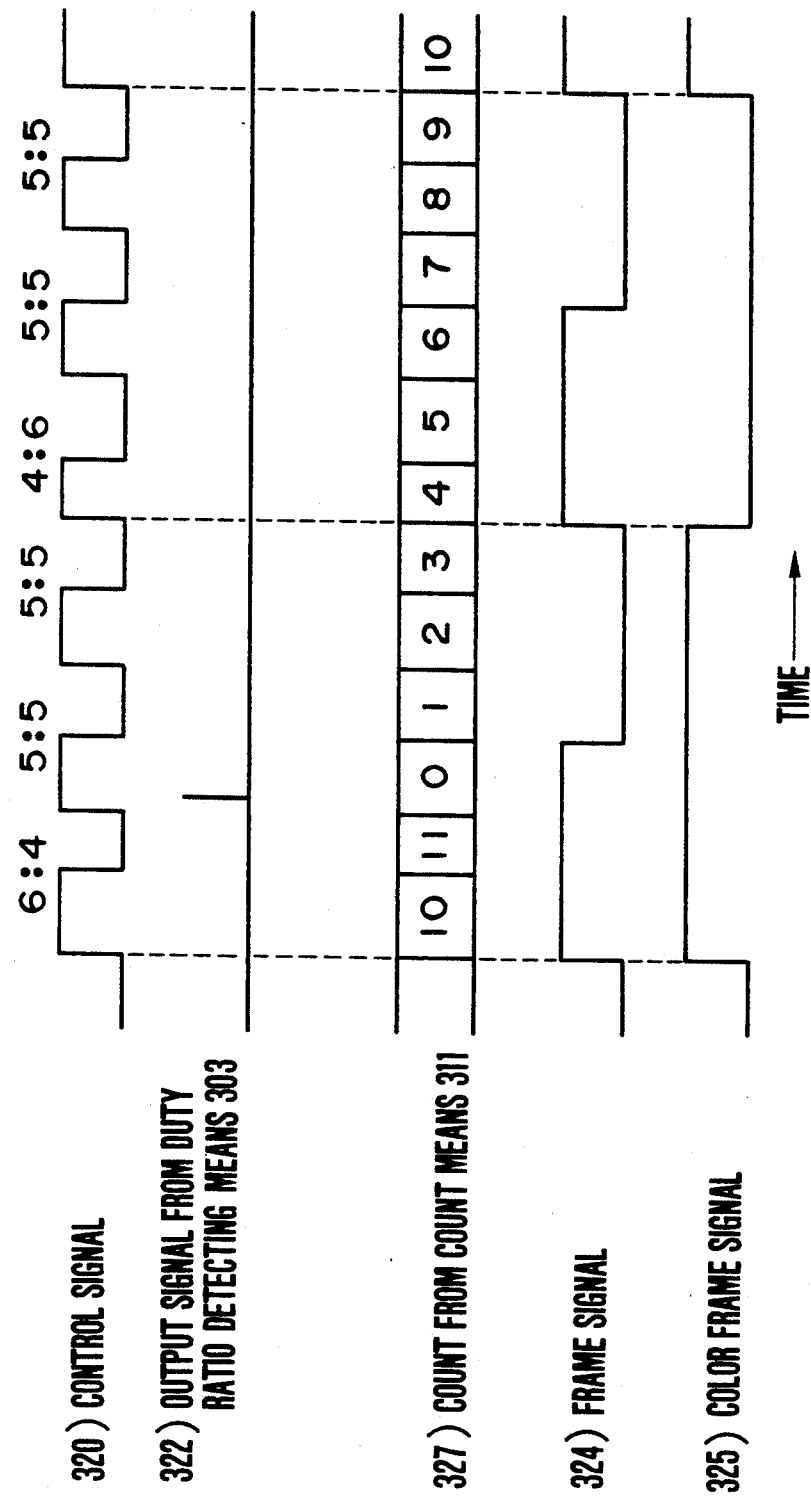

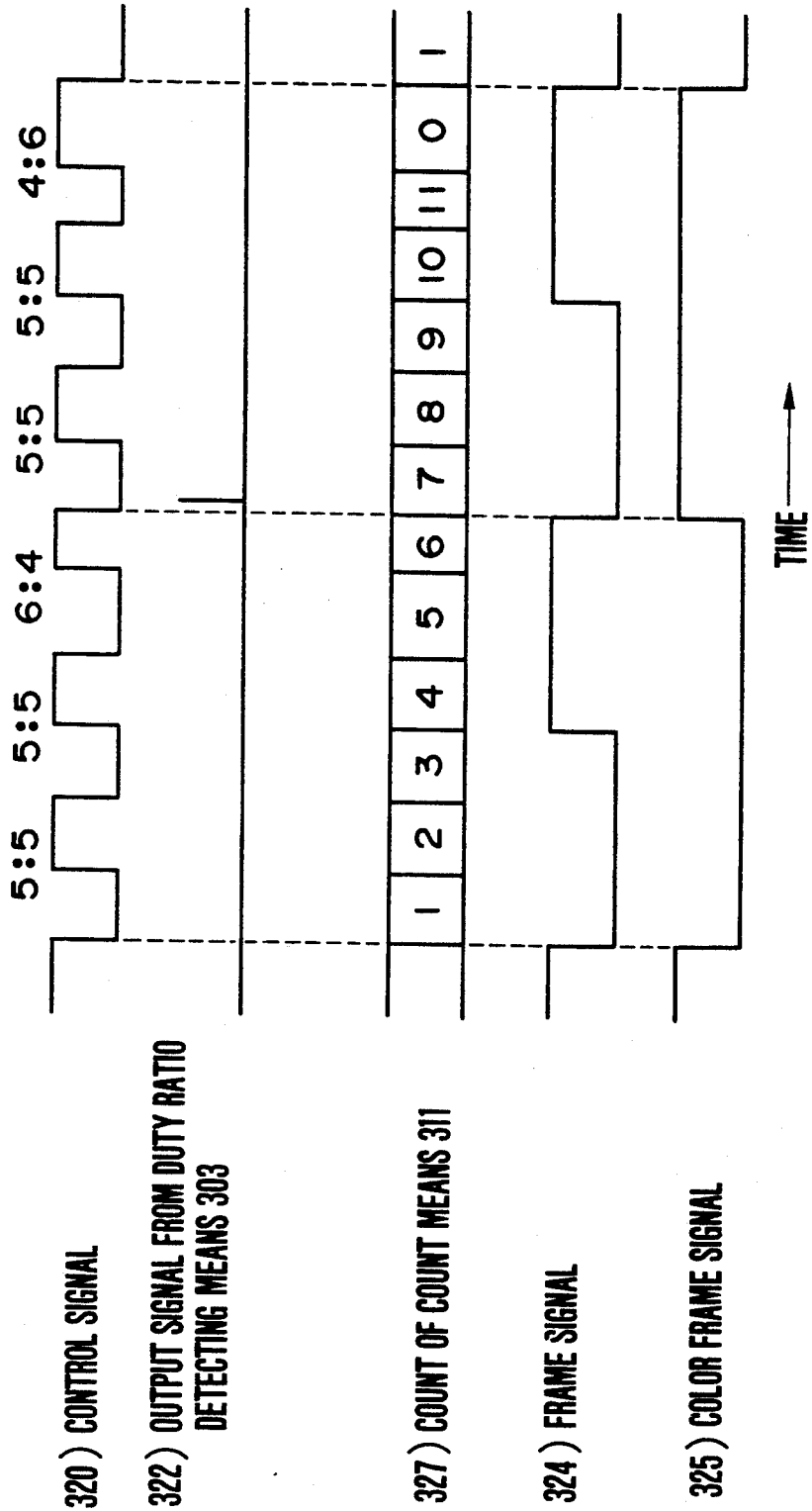

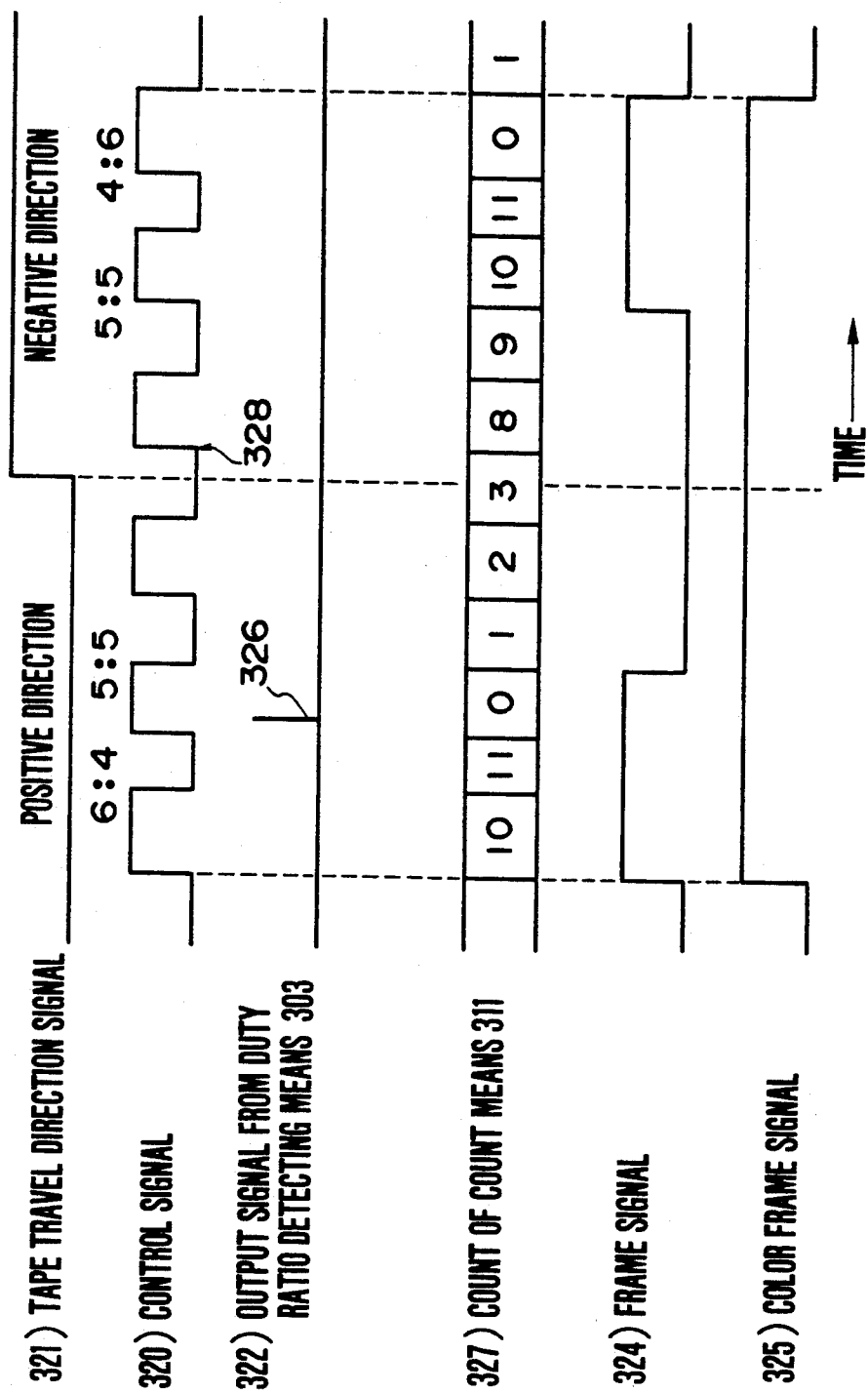

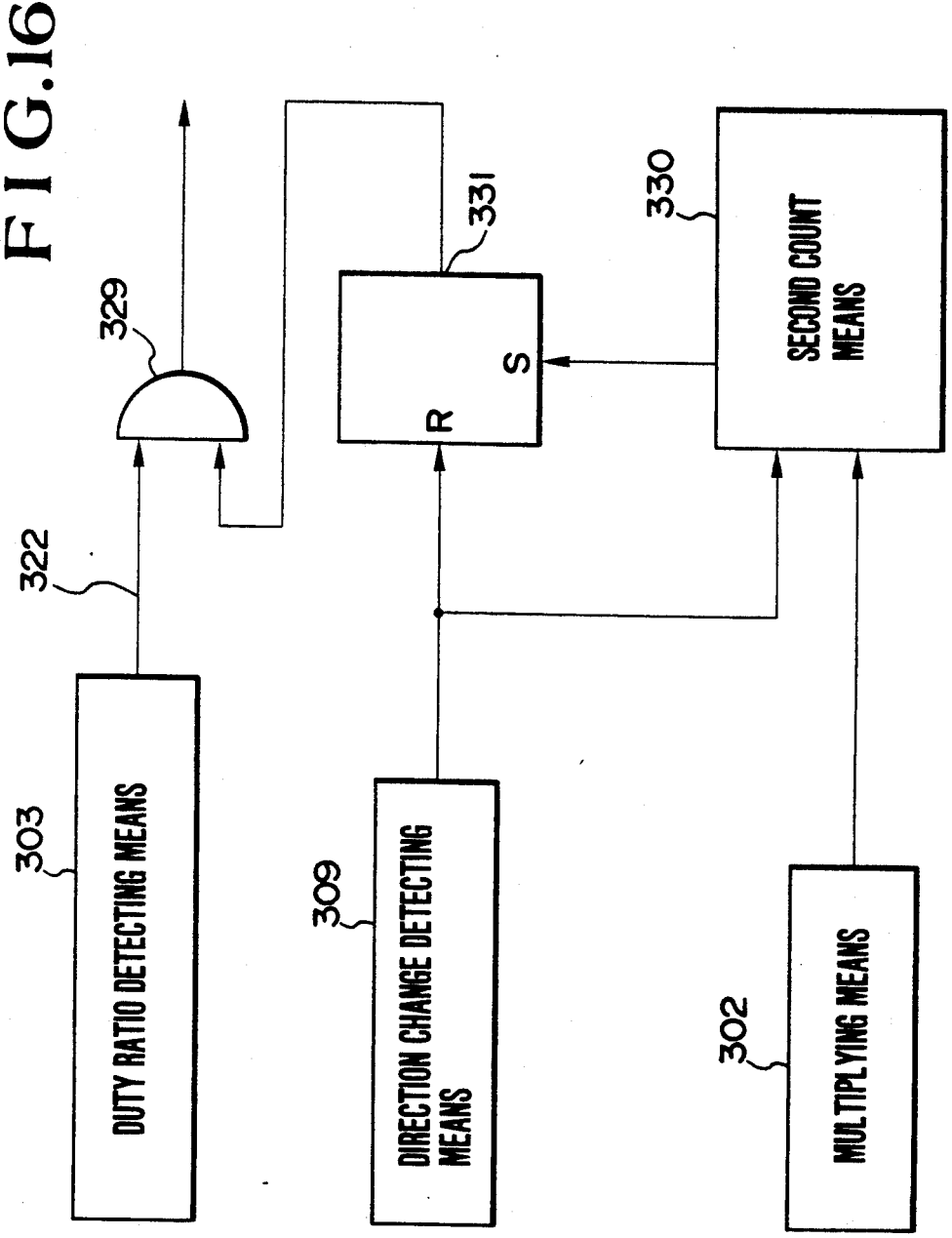

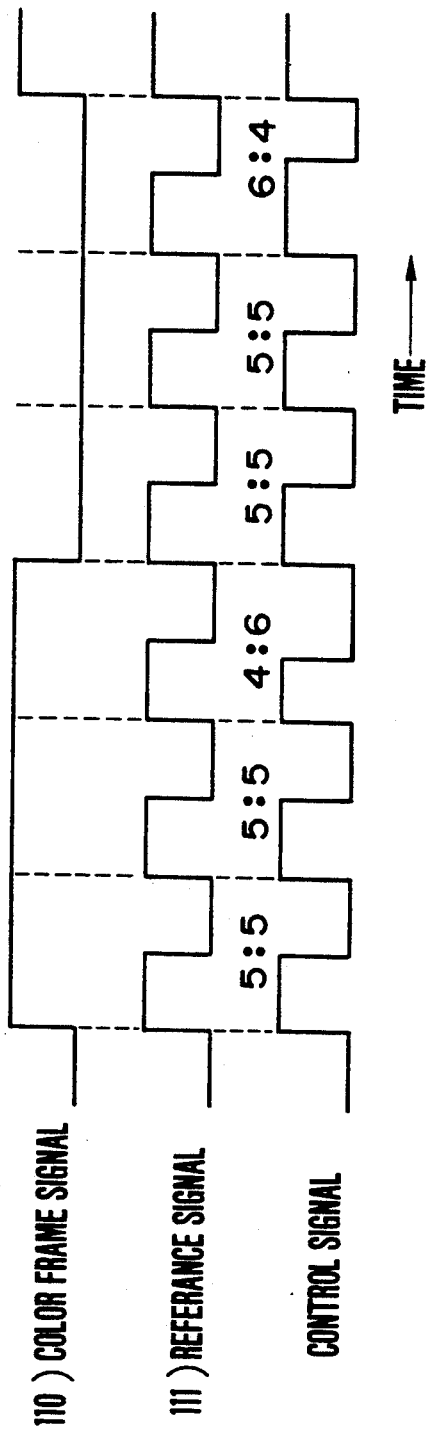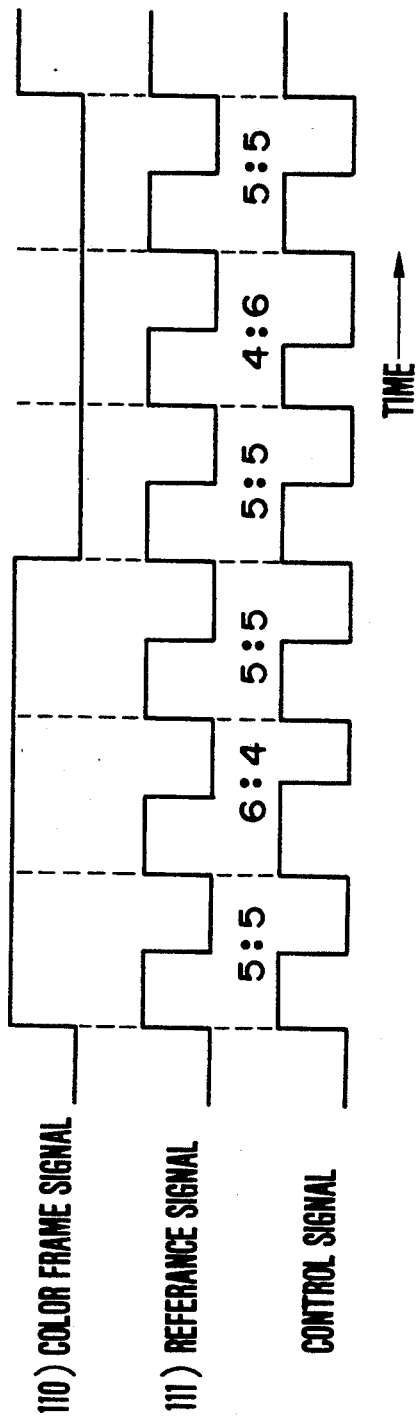

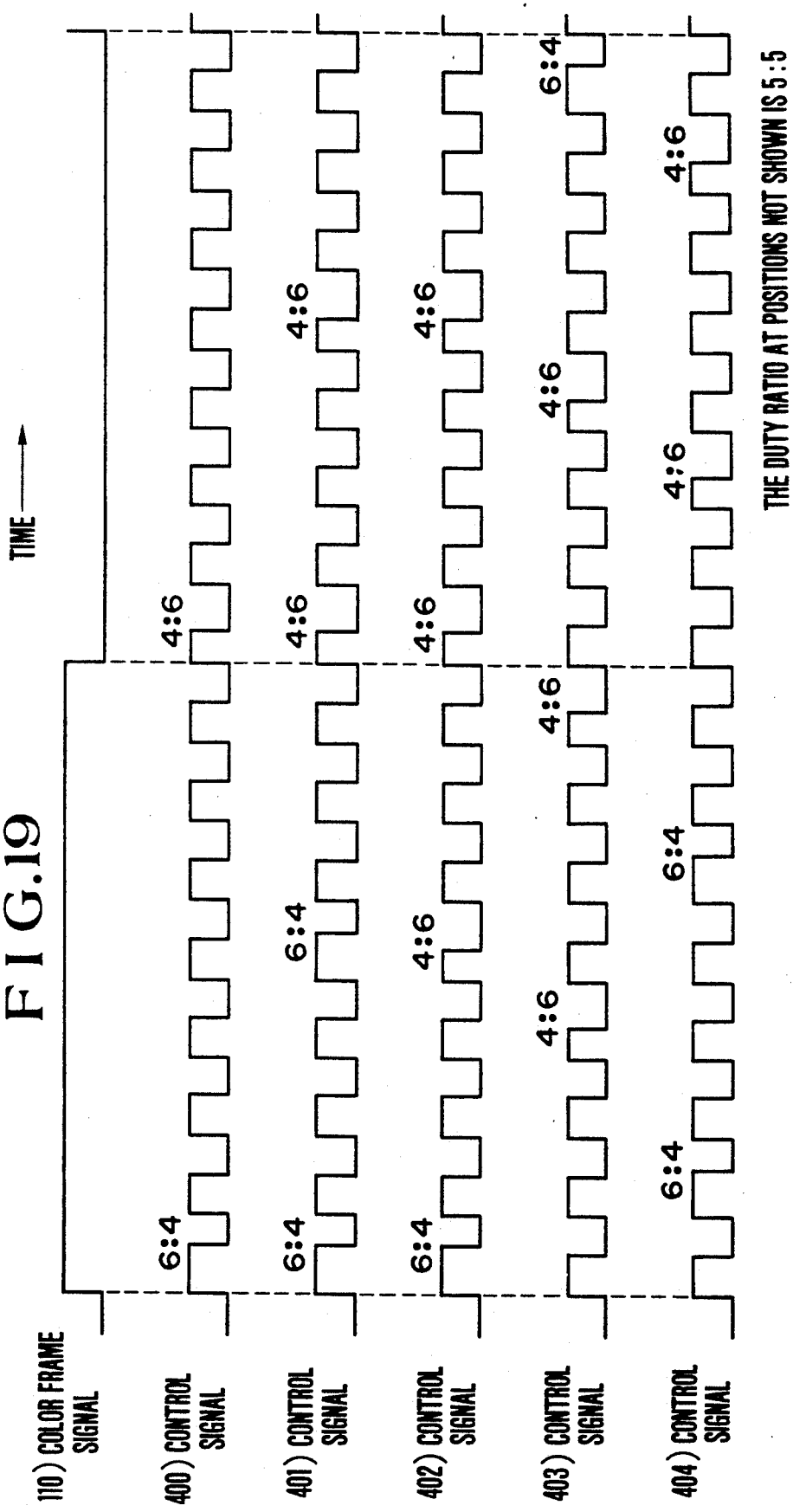

SIGNAL GENERATOR FOR GENERATING A CONTROL SIGNAL INCLUDING A REFERENCE SIGNAL AND SIGNAL SEPARATOR FOR SEPARATING THE REFERENCE SIGNAL FROM THE CONTROL SIGNAL

BACKGROUND OF THE INVENTION

This invention relates to a control signal generator for generating a control signal to be used for tracking control or the like at the time of playback on a video tape recorder or the like, and to a signal separator for separating a reference signal for editing of video signals from the control signal.

Generally in the video tape recorder, it is necessary for the reproduce head to precisely trace the video signal recorded tracks upon playback. This is called tracking. In order to perform tracking, a signal indicating the rotational position of the record head for recording the video signal (hereinafter, referred to as the control signal) is recorded along the longitudinal direction of the video tape, and upon playback this control signal is reproduced so that the position in which the video signal is recorded is detected. Then, control is made to minimize the difference between the phase of the control signal and the phase of the reproduce head for reproducing the video signal, thereby achieving tracking. So far, the frame signal (the rectangular wave signal corresponding to one picture of the video signal) separated from the video signal has been recorded as the control signal on the video tape.

Moreover, on the video tape recorder, a new video signal is recorded to be continuous to the end of the previously recorded video signal on the video tape or to be inserted mid way of the previously recorded video signal on the video tape. This operation is called editing. In this case, upon recording the previously recorded old video signal is just connected to the recorded new video signal in synchronism therewith so that upon playback the reproduced picture is not disturbed at the junction. It is the general practice that for the synchronization between the old and new video signals the frame signal separated from the recorded new video signal is synchronized with the control signal corresponding to the frame of the previously recorded old video signal. As another method of synchronization, the subcarrier signal of the color signal is also synchronized therewith in addition to the frame synchronization. The video signal includes the subcarrier signal for the transmission of the color signal. This subcarrier signal is not returned to the original phase within one frame period. The period in which it is returned to the original phase is two frames in the NTSC system video signal, or four frames in the PAL system video signal. This period is called the color frame period. The group of frames in the color frame period is called the color frames. The first frame of the color frames is specified by the horizontal synchronization signal at a predetermined position and the phase of the subcarrier. The above-mentioned control signal is difficult to be synchronized with the color frames because the phase of the color frames of the recorded video signal is unknown. Therefore, the duty ratio of the control signal is changed with the color frame period so that the color frame information can be carried on the control signal (see "High Performance M II VTRAU660" written by Atushi Kuninaga and others, National Technical Report Vol. 34, No. 6, Dec. 1988, p 89-96 or "M II 625/50 (PAL) format VTR" written by Seiichi Hashimoto and others, National Technical Report Vol. 34, No. 6, Dec. 1988, p. 97-103). Then, the color frame signal (the signal corresponding to one color frame of the video signal) separated from the recorded new video signal is synchronized with the color frame signal separated from the reproduced control signal, thereby easily achieving the color frame synchronization.

In recent years, as the video tape recorder has been digitalized for high performance, the video signal recorded tracks have become narrower and thus more stable tracking has been desired. To satisfy this demand, it is considered that the control signal constituting the reference signal for the tracking is recorded at a higher frequency than the frame signal. However, if the control signal is merely recorded at a higher frequency than the frame signal for the purpose of stabilizing the tracking, the control signal and the frame signal cannot be easily synchronized upon editing. Thus, in order to increase the frequency of the control signal and make synchronization with the control signal upon editing, the control signal, a signal as a reference for the tape travel and a reference signal for editing, or information of frame and color frame signals are simultaneously recorded, and upon playback, the reference signal for the tape travel and the reference signals for the editing are separated and used for the above purposes (the reference for the tape travel and the editing).

For such a video tape recorder, the International Radio Communications advisory committee standardized a DI format video tape recorder for a broadcasting digital video tape recorder in 1986. In the DI format video tape recorder, when an NTSC system video signal is recorded, the video signal of each frame is divided into parts of 20 tracks. Then, one pulse for each four tracks is recorded as a reference point for the tape travel. Thus, five reference points for the tape travel correspond to one frame of the video signal. At the reference point for the tape travel corresponding to the beginning of the frame of the video signal, a pulse indicating the beginning of the video signal is recorded at a position following the pulse indicating the reference point for the tape travel. Since in the NTSC system video signal two frames is one color frame period, at the reference point for the tape travel corresponding to the beginning of the color frame of the video signal a pulse indicating the beginning of the color frame of the video signal is recorded at a predetermined position following the pulse indicating the beginning of the frame of the video signal. These pulse signals are recorded in the longitudinal direction of the video tape by the bias recording system (see "4:2:digital VTR format" written by Takeo Eguchi, the Journal of the Institute of Television Engineers of Japan, Vol. 40, No. 6, 1986, p. 457-464).

The bias recording system, as compared with the saturation recording system used to record the control signal in the conventional analog-type video tape recorder, requires a peaking coil and a bias signal generating circuit, thus having the disadvantage of large circuit scale which leads to high cost and large size. Moreover, since the control signal is generally recorded by the conventional saturation recording system, the conventional control signal recording and reproducing IC cannot be used.

In the conventional saturation recording system, though the color frame information is carried out on the control signal recorded at the frame frequency, there is no provision for increasing the frequency of the control signal and for synchronization with the control signal upon editing by recording the control signal simultaneously with the reference signal for the tape travel and with the reference signals for editing and for upon reproduction, separating and using the reference signal for the tape travel and the reference signals for editing for the above purposes (the reference of the tape travel and the editing).

SUMMARY OF THE INVENTION

Accordingly, it is an object of this invention to provide a control signal generator for generating a control signal which has a higher frequency than the frequencies of the reference signals (the frame frequency and the color frame frequency) for the editing of a video signal, which includes the information of the reference signals to be used upon editing, and which is suited for a saturation recording system, and to provide a signal separator for separating the reference signals for editing the video signal from the control signal which is generated, recorded and reproduced, thereby reducing the circuit scale of the control signal recording and reproducing system.

According to this invention, there is provided a control signal generator comprising:

first signal-forming means, in synchronization with a first reference signal applied thereto and having a predetermined frequency and a second reference signal applied thereto and having a frequency N times (N is a natural number larger than two) higher than that of the first reference signal and having a first duty ratio, for forming a third signal which has a second duty ratio different from said first duty ratio;

second signal-forming means for forming a fourth signal which is synchronized with the second reference signal and has a third duty ratio different from the first and second duty ratios; and switching means which is supplied with the first and second reference signals, and switches the second reference signal, the third signal and the fourth signal in a certain order with the period of the first reference signal.

Also, according to this invention, there is provided a signal separator comprising:

multiplying means for providing output pulses in according with rising and falling edges of a control signal;

duty ratio detecting means for detecting a predetermined duty ratio of the control signal;

up-down counter means which counts the pulse from the multiplying means, is preset by an output signal from the duty ratio detecting means, and is controlled in the count direction and preset value by the tape travel direction; and decode means for detecting that the count of the up-down counter means is a certain value.

BRIEF DESCRIPTION OF THE DRAWINGS

FIGS. 13 to 15 are timing charts to which reference is made in explaining the operation of the signal separator of the third embodiment.

FIG. 16 is a block diagram of another construction of the duty ratio detecting means in the second and third embodiments of the signal separator of this invention.

FIGS. 17 to 19 are timing charts showing other waveforms of the control signal generated from the control signal generator in the embodiments of the invention.

DETAILED DESCRIPTION OF THE PREFERRED EMBODIMENTS

With reference to the accompanying drawings, one embodiment of a control signal generator of this invention will be described in which a reference signal for the tape travel is recorded at three times the frequency of a frame signal on a video tape recorder for recording an NTSC system video signal.

Figure 1:
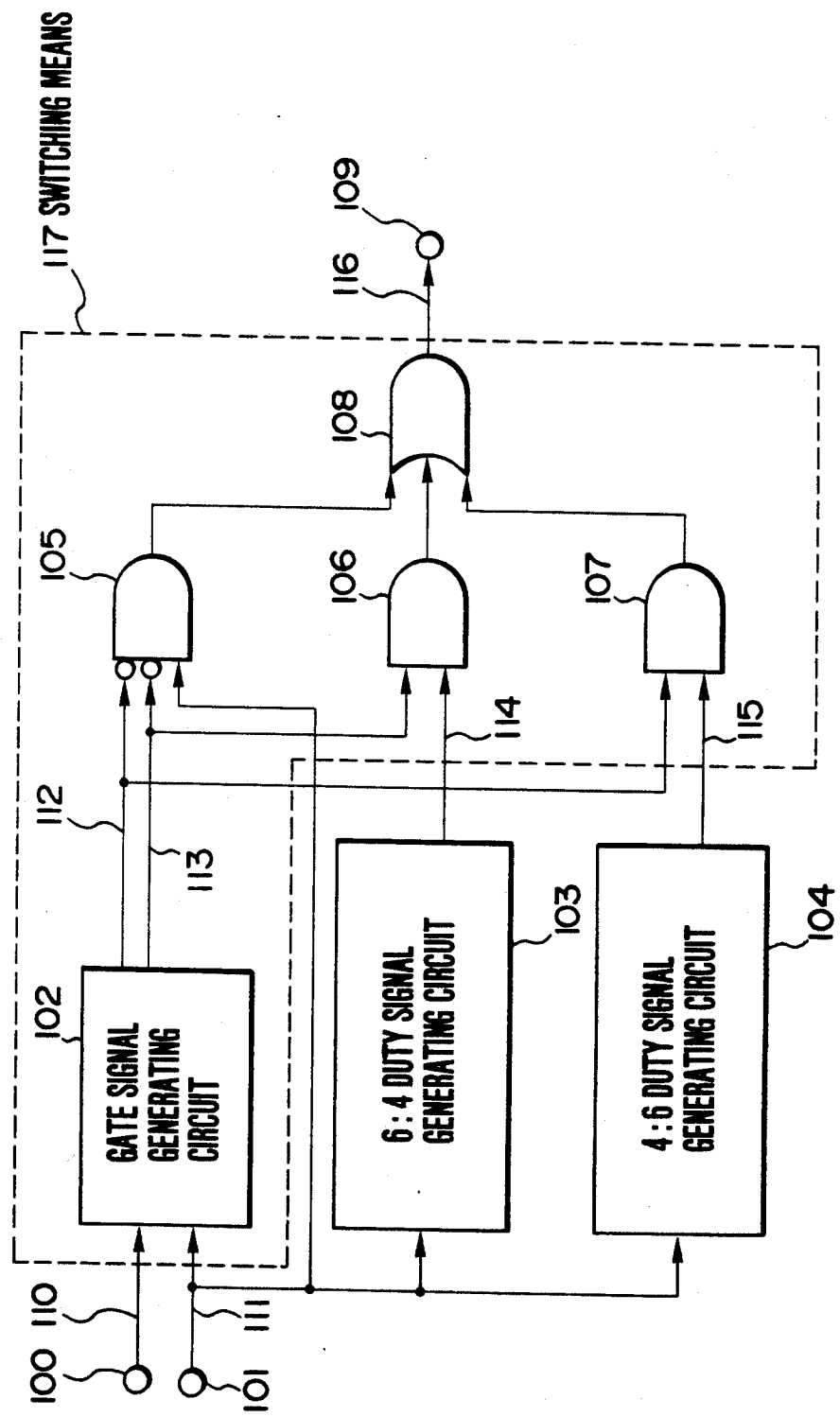
FIG. 1 is a block diagram of an embodiment of a control signal generator according to this invention.

FIG. 1 is a block diagram of a control signal generator of the invention for generating a control signal. Referring to FIG. 1, there are shown an input terminal 100 to which a color frame signal (first reference signal) 110 synchronized with a video signal to be recorded, and an input terminal 101 to which a reference signal (second reference signal) 111 which is synchronized with the video signal, and has three times the frequency of a frame signal and a duty ratio of 5:5. Also, there is shown a gate signal generating circuit 102 which is supplied with the color frame signal 110 and the reference signal 111 and produces a first gate signal 112 which is raised to high level at the leading edge of the color frame signal 110 and kept at high level during one period of the reference signal 11 and is low level in the other period, and produces a second gate signal 113 which is raised to high level at the trailing edge of the color frame signal 110 or at the point of ½ the period of the color frame signal and kept at high level during one period of the reference signal 111 and is low level in the other period. Shown at 103 is a 6:4 duty signal generating circuit which is supplied with the reference signal 111 and produces a signal 114 of duty ratio 6:4 synchronized with the reference signal 111, at 104 is a 4:6 duty signal generating circuit which is responsive to the reference signal 111 to produce a 4:6 duty ratio signal 115 synchronized with the reference signal 111, and at 105 is an AND circuit for producing the logical product of the inverted signal of the first gate signal 112, the inverted signal of the second gate signal 113 and the reference signal 111. Shown at 106 is an AND circuit for producing the first gate signal 112 and the output signal 114 from the 6:4 duty ratio signal generating circuit 103, at 107 is an AND circuit for producing the logical product of the second gate signal 113 and the output signal 115 from the 4:6 duty ratio signal generating circuit 104, and at 108 is an OR circuit for producing the logical sum of the outputs from the AND circuits 105, 106 and 107. Shown at 109 is an output terminal through which an output signal 116 from the OR circuit 108 is produced. In this figure, switching means is indicated by a dotted line block 117.

The operation of the control signal generator of this arrangement will be described with reference to the timing chart of FIG. 2.

Figure 2:
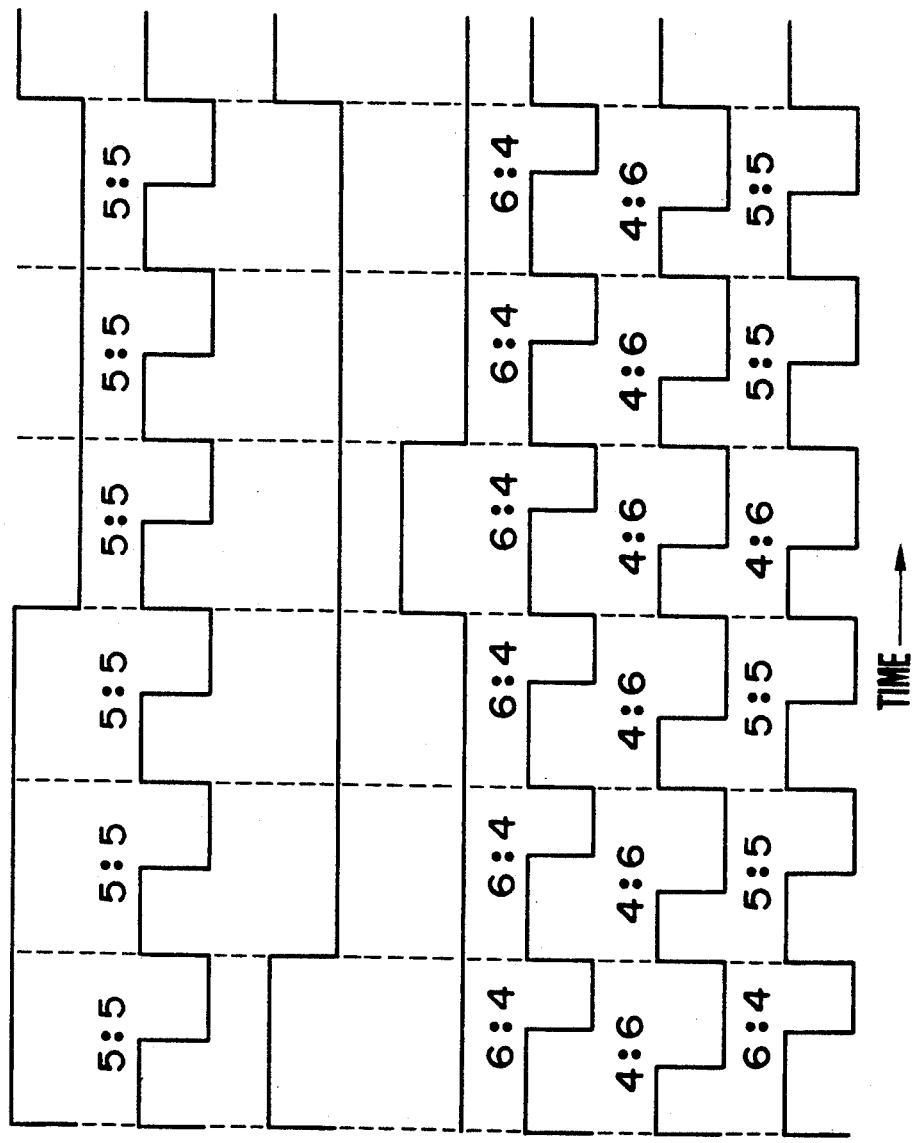
FIG. 2 is a timing chart to which reference is made in explaining the operation of the control signal generator.

When the color frame signal 110 shown in FIG. 2 is supplied to the input terminal 100, and the 5:5 duty ratio reference signal 111 (as shown in FIG. 2, the duty ratio is indicated above the waveform, and for other signals the duty ratio is similarly indicated on the waveforms) having three times the frequency of the frame signal (not shown) is supplied to the input terminal 101, the gate signal generating circuit 102 produces the first and second gate signals 112, 113 as shown in FIG. 2. The 6:4 duty signal generating circuit 103 produces the 6:4 duty ratio signal 114 (as shown in FIG. 2) synchronized with the reference signal 111 supplied to the input terminal 101. At the same time, the 4:6 duty signal generating circuit 104 produces the 4:6 duty ratio signal 115 (shown in FIG. 2) synchronized with the reference signal 111 supplied to the input terminal 101. Then, the AND circuit 105 produces the reference signal 111 during the time in which the first gate signal 112 and the second gate signal 113 are both low level, the AND circuit 106 produces the 6:4 duty ratio signal 114 during the time in which the first gate signal 112 is high level, and the AND circuit 107 produces the 4:6 duty ratio signal 115 during the time in which the second gate signal 113 is high level. The output signals from the AND circuits 105, 106 and 107 are added together by OR circuit 108 and as a result the control signal 116 shown in FIG. 2 is produced at the output terminal 109. The produced control signal 116 is recorded by the saturation recording system in the longitudinal direction of the video tapes. As will be clear from FIG. 2, the leading edge of the control signal 116 becomes the reference position for the tape travel, the leading edges of the 6:4 and 4:6 duty ratio pulses indicate the positions at which the frame starts, and the leading edge of the 6:4 duty ratio pulses indicates the position at which the color frame starts. Thus, the control signal 116 includes information of the position at which the frame starts and the position at which the color frame starts as well.

According to the control signal generator of this embodiment, the reference signal from the tape travel recorded at three times the frame frequency and information of the reference signals (frame, color frame) for editing the video signal to be recorded can be compounded to form the control signal, that is recorded together with the video signal.

A description will be made of the signal separator for extracting the frame signal and color frame signal from the control signal which is generated from the control signal generator of this embodiment, and recorded on and reproduced from a video tape.

Figure 3:
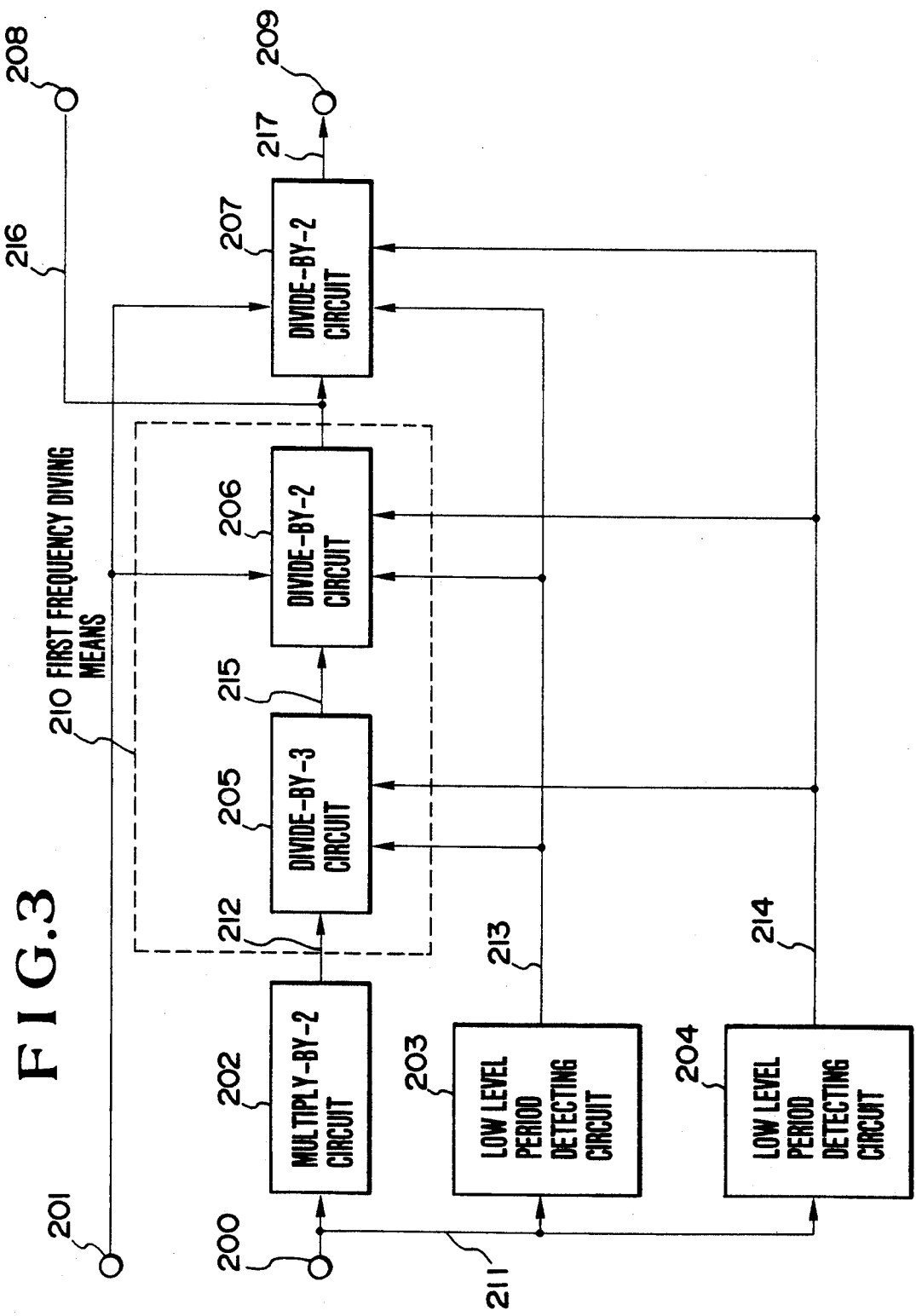
FIG. 3 is a block diagram of a first embodiment of a signal separator according to the invention.

FIG. 3 is a block diagram of one embodiment of the signal separator. Shown at 200 is an input terminal to which a control signal 211 reproduced from a video tape is supplied, at 201 is an input terminal to which a signal indicating the travel direction of the video tape, and at 202 is a multiplying-by-2 circuit for multiplying the input control signal 211 by 2. Shown at 203 is a first low level detecting circuit (first duty ratio detecting circuit) for detecting that the low level period of the input control signal 211 is 0.45 times or below one period of the control signal and producing a pulse, at 204 is a second low level period detecting circuit (second duty ratio detecting circuit) for detecting that the low level period of the input control signal 211 is 0.55 times or above one period of the control signal and producing a pulse, and at 205 is a divide-by-3 frequency dividing circuit which divides the output signal 212 from the multiply-by-2 circuit 202 by 3 and is preset by the output signal 213 from the first low level period detecting circuit 203 and the output signal 214 from the second low level period detecting circuit 204 so that the frequency divided output 215 is risen from low level to high level by the next output pulse from the multiply-by-2 circuit 202. Shown at 206 is a divide-by-2 frequency dividing circuit which divides the output signal 215 from the divide-by-3 frequency dividing circuit 205 by 2 and is preset by the output signal 213 from the first low level period detecting circuit 203 and the output signal 214 from the second low level period detecting circuit 204 so that the output signal is high level when the input tape travel direction indicating signal indicates the positive direction or that it is low level when the input tape travel direction indicating signal indicates the negative direction. Shown at 207 is a divide-by-2 frequency dividing circuit which divides by 2 the output signal 216 from the divide-by-2 circuit 206, which is preset by the pulse of the output signal 213 from the first low level period detecting circuit 203 so that the output is high level and by the pulse of the output signal 214 from the second low level period detecting circuit 204 so that the output is low level when the input tape travel direction signal at the input terminal 201 indicates the positive direction, and which is preset by the output signal 213 from the first low level period detecting circuit 203 so that it is low level and by the output signal 214 from the second low level period detecting circuit 204 so that it is high level when the tape travel direction is negative. Shown at 208 is an output terminal at which the output signal 216 from the divide-by-2 frequency dividing circuit 206 is produced, and at 209 is an output terminal at which the output signal 217 from the divide-by-2 frequency dividing circuit 207 is produced. In this figure, first frequency dividing means is indicated by a dotted line block 210, and second frequency dividing means is the divide-by-2 frequency dividing circuit 207.

The operation of the signal separator of this arrangement will be mentioned below.

Figure 4:
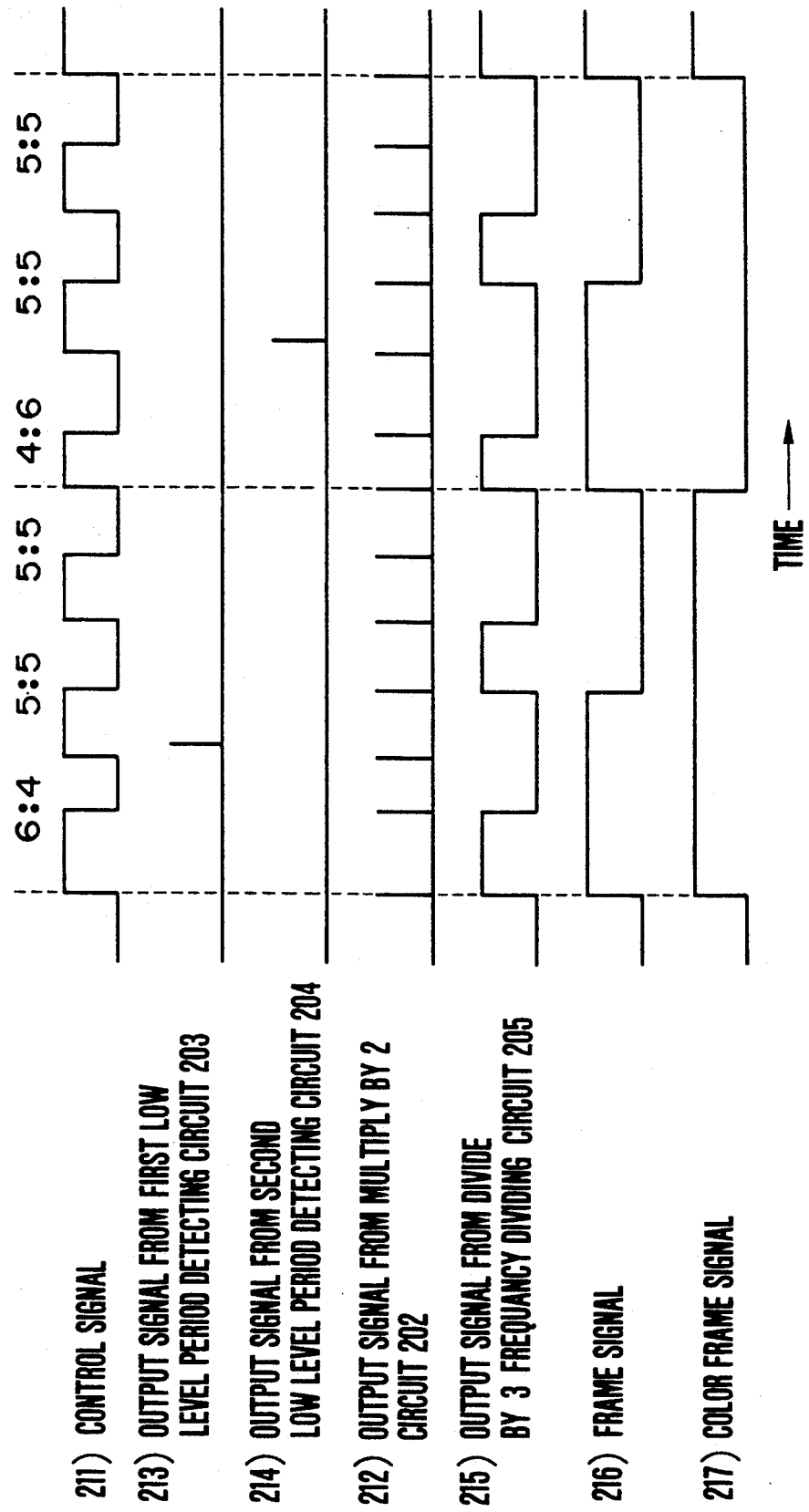
FIGS. 4 and 5 are timing charts to which reference is made in explaining the operation of the signal separator.

First, the operation of the signal separator in the case when the video tape is transported in the positive direction (in the same direction as at the time or recording) will be described with reference to the timing chart of FIG. 4. When the video tape is transported in the positive direction, the control signal 211 of the waveform shown in FIG. 4 is reproduced. When the reproduced control signal 211 shown in FIG. 4 is supplied to the input terminal 200, the multiply-by-2 circuit 202 produces a pulse at both edges of each pulse of the control signal 211, or the signal 212 resulting from multiplying the control signal 211 by 2. The first low level period detecting circuit 203 produces a pulse, or the signal 213 shown in FIG. 4 when the low level period of the input control signal 211 is 0.45 times or below one period of the control signal 211. The low level period detecting circuit 204 produces a pulse, or the signal 214 shown in FIG. 4 when the low level period of the input control signal 211 is 0.55 times or above one period of the control signal. The divide-by-3 frequency dividing circuit 205 divides the output signal 212 from the multiply-by-2 circuit 202 by 3 and is preset by the pulses of the output signals 213, 214 from the low level period detecting circuits 203, 204 so that the output signal 215 has the phase shown in FIG. 4. The divide-by-2 circuit 206 detects from the input signal at the input terminal 201 that the video tape travel direction is positive, is preset by the output signals 213, 214 from the low level period detecting circuits 203, 204 so that the output signal 216 is high level, and divides the output signal 215 from the divide-by-3 frequency dividing circuit 205 by 2 to produce the signal 216 shown in FIG. 4. Similarly, the divide-by-2 frequency dividing circuit 207 detects from the input signal at the input terminal 201 that the video tape travel direction is positive, is preset by the output signal 213 from the low level period detecting circuit 203 so that the output signal is high level and by the output signal 214 from the low level period detecting circuit 204 so that the output signal is low level, and divides the output signal 216 from the divide-by-2 frequency dividing circuit 206 by 2 to produce the signal 217 shown in FIG. 4. As will be obvious from FIG. 4, the frame signal 216 separated from the control signal 211 is produced at the output terminal 208, and the color frame signal 17 separated from the control signal 211 is produced at the output terminal 209.

Figure 5:
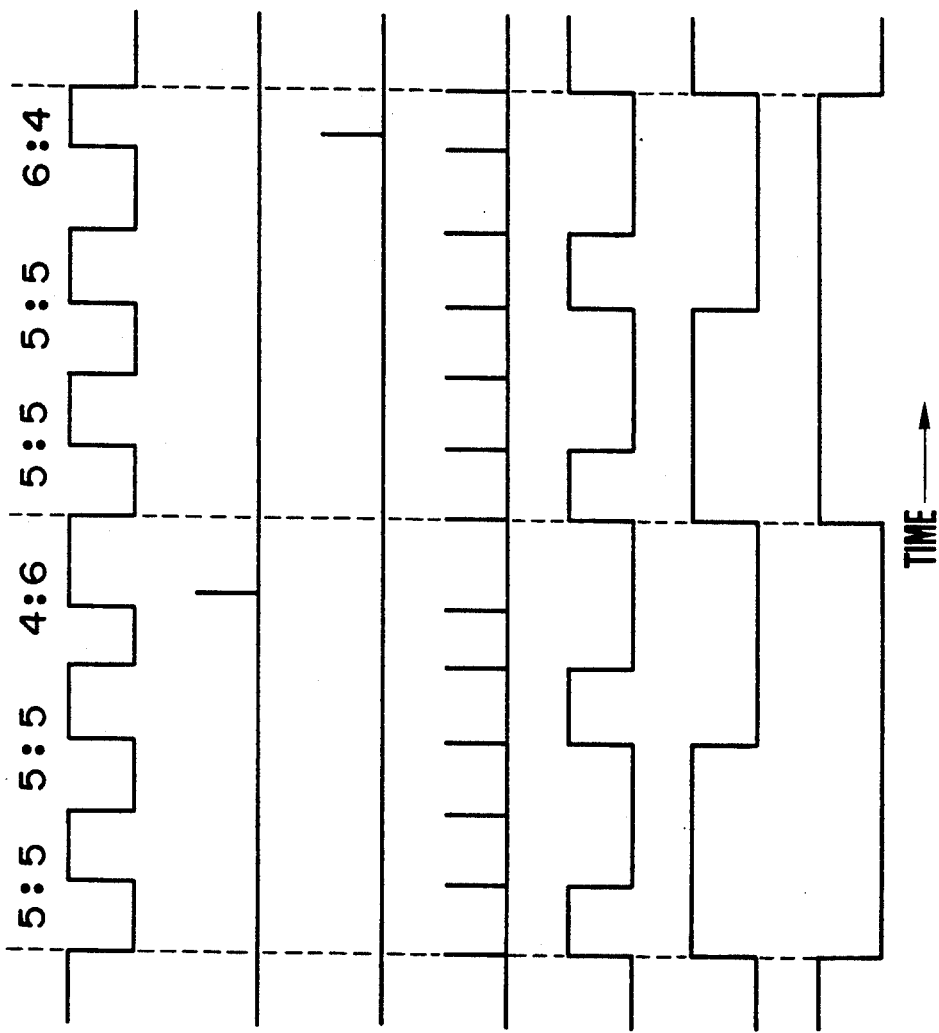

The operation of the signal separator in the case when the video tape is transported in the negative direction (in the opposite direction to that upon recording) will be described with reference to the timing chart of FIG. 5. When the video tape is travelled in the negative direction, the control signal 211 of the waveform shown in FIG. 5 is reproduced. When the control signal 211 shown in FIG. 5 is supplied to the terminal 200, the multiply-by-2 circuit 202 produces pulses at both edges of each pulse of the control signal 211, or the signal 212 resulting from multiplying the control signal 211 by 2. The low level period detecting circuit 203 detects the low level period of the input control signal 211 and produces a pulse, or the signal 213 shown in FIG. 5 when the period is 0.45 times or below one period of the control signal 211. The low level period detecting circuit 204 detects the low level period of the input control signal 211, and produces a pulse, or the signal 214 shown in FIG. 5 when the period is 0.55 times or above one period of the control signal 211. The divide-by-3 frequency dividing circuit 205 divides the output signal 212 from the multiply-by-2 circuit 202 by 3 to produce the output signal 215 shown in FIG. 5 so that the output signal 215 is made low level by the pulses of the output signals 213, 214 from the low level period detecting circuits 203, 204 and made high level by the next output pulse from the multiply-by-2 circuit 202. The divide-by-2 frequency dividing circuit 206 detects from the input signal at the input terminal 201 that the video tape travel direction is negative, is preset by the pulses of the output signals 213, 214 from the low level period detecting circuits 203, 204 so that the output signal is low level, and divides the output signal 215 from the divide-by-3 frequency dividing circuit 205 by 2 to produce the output signal 216 shown in FIG. 5. Similarly, the divide-by-2 frequency dividing circuit 207 detects from the input signal at the input terminal 201 that the video tape travel direction is negative, is preset by the pulse of the output signal 213 from the low level period detecting circuit 203 so that the output signal 217 is low level, by the output signal 214 from the low level period detecting circuit 204 so that the output signal 217 is high level, and divides the output signal 216 from the divide-by-2 frequency dividing circuit 206 by 2 to produce the signal 217 shown in FIG. 5. As will be apparent from FIG. 5, the frame signal 216 separated from the control signal 211 is produced at the output terminal 208, and the color frame signal 217 separated from the control signal 211 is produced at the output terminal 209.

As shown in FIGS. 4 and 5, the frame signal and the color frame signal which rise and fall at the same positions in response to the change of the duty ratio of the reproduced control signal can be separated even when the video tape is transported in either the positive or the negative direction. Thus, the separated frame signal and color frame signal can be synchronized with those separated from an external video signal, so that clear editing can be easily realized. If under the positive tape travel direction, the leading edge of the reproduced control signal is made the reference for the tape travel and under the negative tape direction, the trailing edge of the reproduced control signal is made the reference for the tape travel, then a reference signal for tape travel, of three times the frame frequency, can be obtained, thus realizing stable tape travel. Moreover, since the control signal is of the same rectangular waveform as in the prior art, the conventional saturation recording circuit can be used, thus making the circuit scale small.

Figure 6:
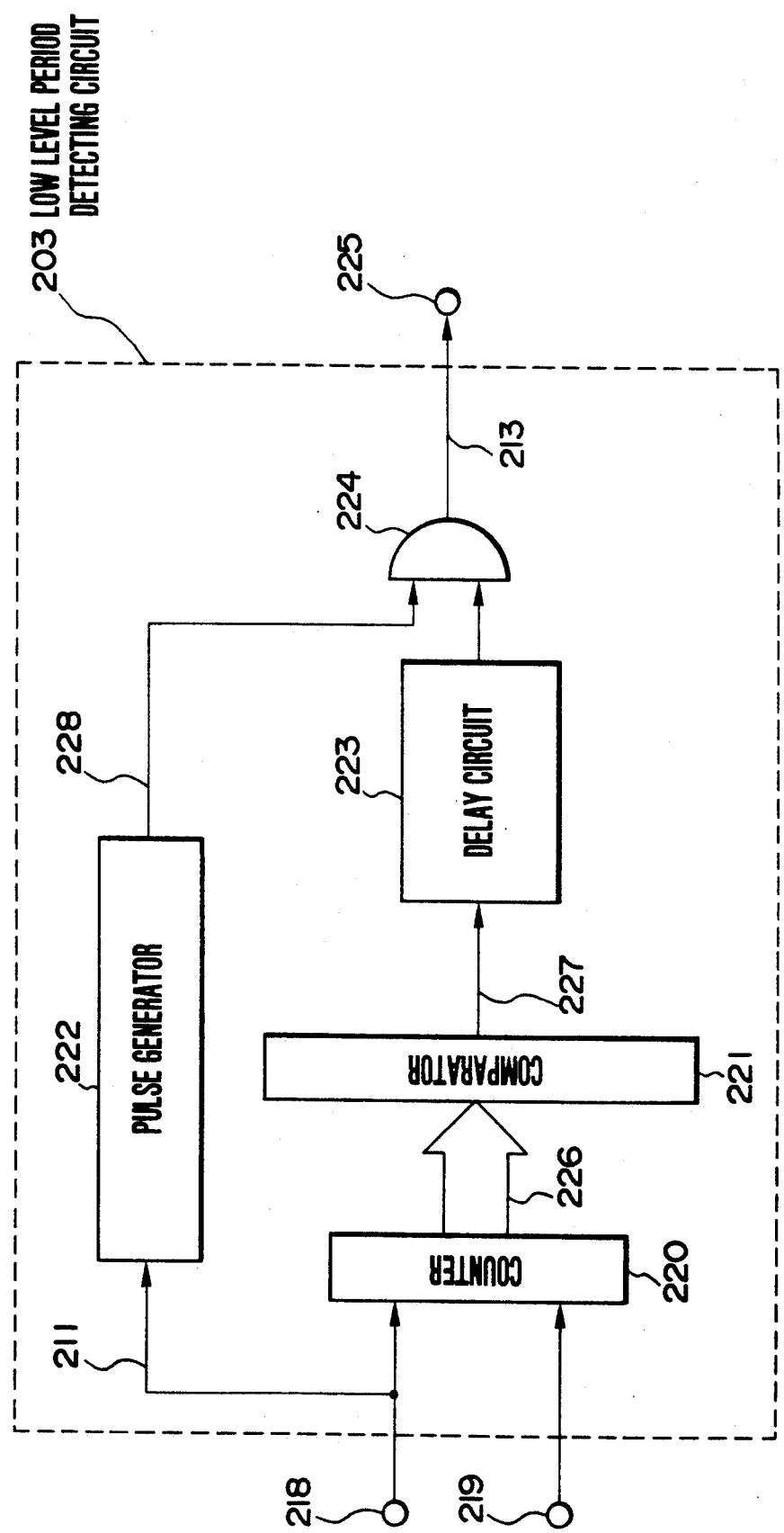
FIG. 6 is a block diagram showing the details of the low level period detecting circuit in the first embodiment of the signal separator of this invention.

If in the signal separator of the first embodiment the low level period detecting circuits 203, 204 are arranged to count the clock signal (for example, capstan frequency signal) proportional to the tape travel speed, the frame signal and the color frame signal can be separated irrespective of whether the tape travel speed is changed. FIG. 6 is a block diagram of the low level period detecting circuit 203. Shown at 218 is an input terminal to which the control signal 211 is supplied, and at 219 is an input terminal to which the capstan frequency signal (hereinafter, referred to as the capstan FG) is supplied. Shown at 220 is a counter which is reset during the high level period of the control signal 211, and counts the capstan FG signal during the low level period, and at 221 is a comparator which produces a low level when the count is a count 231, or 0.45 times or above one period of the control signal 211. Shown at 222 is a pulse generator which generates a pulse 228 at the leading edge of the control signal 211, at 223 is a delay circuit for delaying the output signal 227 from the comparator 221, and at 224 is an AND circuit for producing the logical product of the output signal 228 from the pulse generator 222 and the output signal from the delay circuit 223. Shown at 225 is an output terminal of the low level period detecting circuit 203 at which the output signal from the AND circuit 224 is produced.

Figure 7:
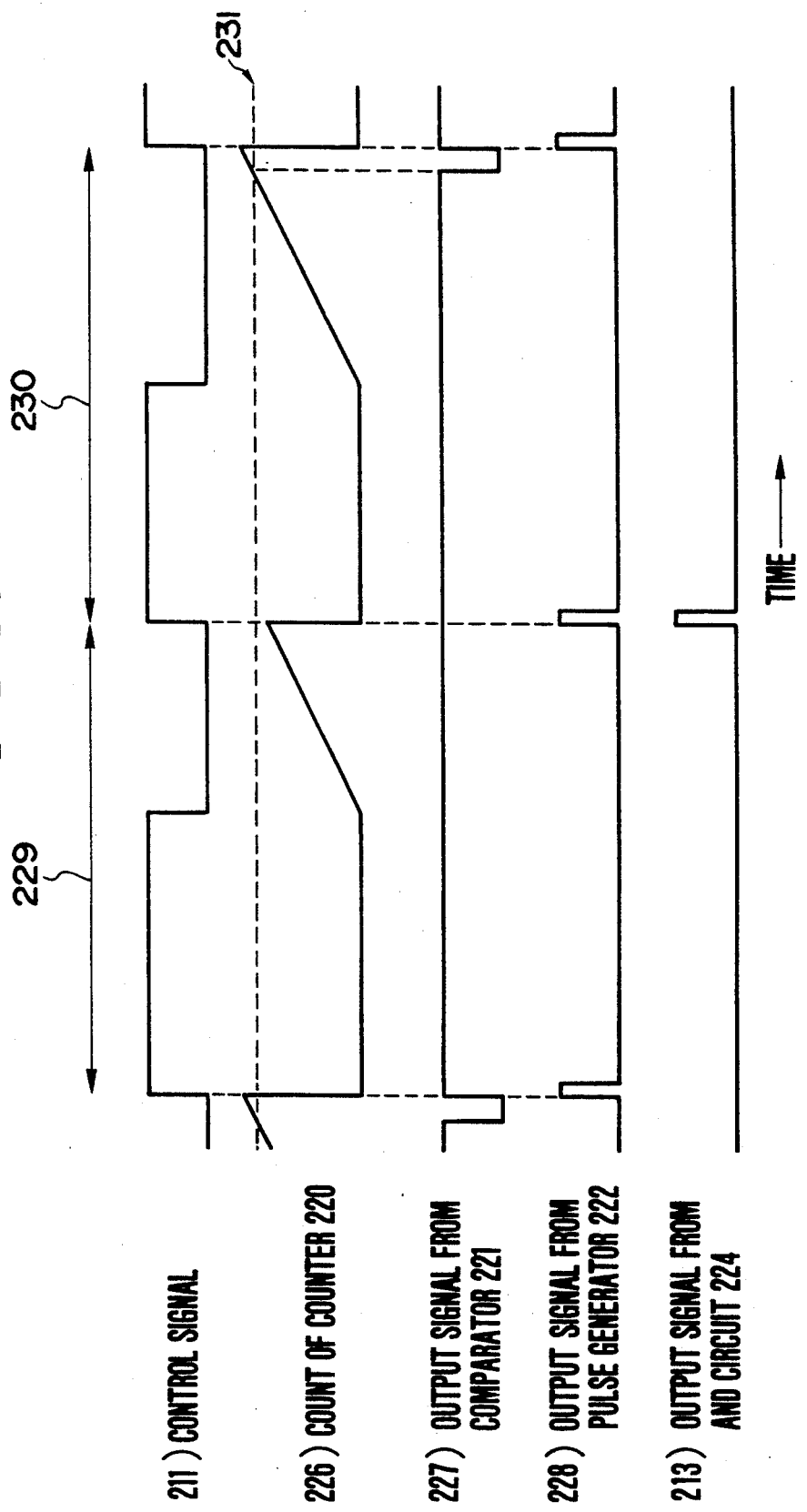
FIG. 7 is a timing chart to which reference is made in explaining the operation of the low level period detecting circuit.

The operation of the low level period detecting circuit 203 of this arrangement will be described with reference to the timing chart of FIG. 7. When the control signal 211 shown in FIG. 7 (in the period 229 the duty ratio is 6:4, and in the period 230 the duty ratio is 5:5) is supplied to the input terminal 218, the counter 220 is reset in the high level period of the control signal 211, and counts the capstan FG in the low level period. Thus, as shown in FIG. 7 at 226, the counting is made during the time corresponding to the length of the low level period of the control signal 211. Since the comparator 221 produces low level when the count 226 is 0.45 times or above one period of the control signal 211, or count 231, the comparator produces no low level during the period 229 of the control signal 211, and produces low level during the period 230, or produces the signal 227 shown in FIG. 7. The pulse generator 222 generates a pulse at the leading edge of the control signal 211, or produces the output signal 228 shown in FIG. 7. The output signal 227 from the comparator 221 is delayed by the delay circuit 223, and the AND circuit 224 produces the logical product of the output signal 228 from the pulse generator 222 and the delayed signal. By increasing the amount of delay in the delay circuit 223 slightly more than the pulse width of the pulse from the pulse generator 222, it is possible to produce at the output terminal 225 the output signal 213 shown in FIG. 7. As shown in FIG. 7, the position of the duty ratio 6:4 of the control signal period 229 can be detected. Moreover, the low level period detecting circuit 204 can be realized by changing the comparing value of the comparator 221 and by inverting the polarity of the output signal 227.

The low level period detecting circuits 203, 204 may be arranged so that the period of the input control signal is counted and that the result is calculated to be the reference for the detection of the duty ratio.

The second embodiment of a signal separator of this invention will now be described. In the first embodiment, when the tape travel direction is reversed, the frame signal and the color frame signal cannot be separated, while in the second embodiment this problem can be solved.

Figure 8:
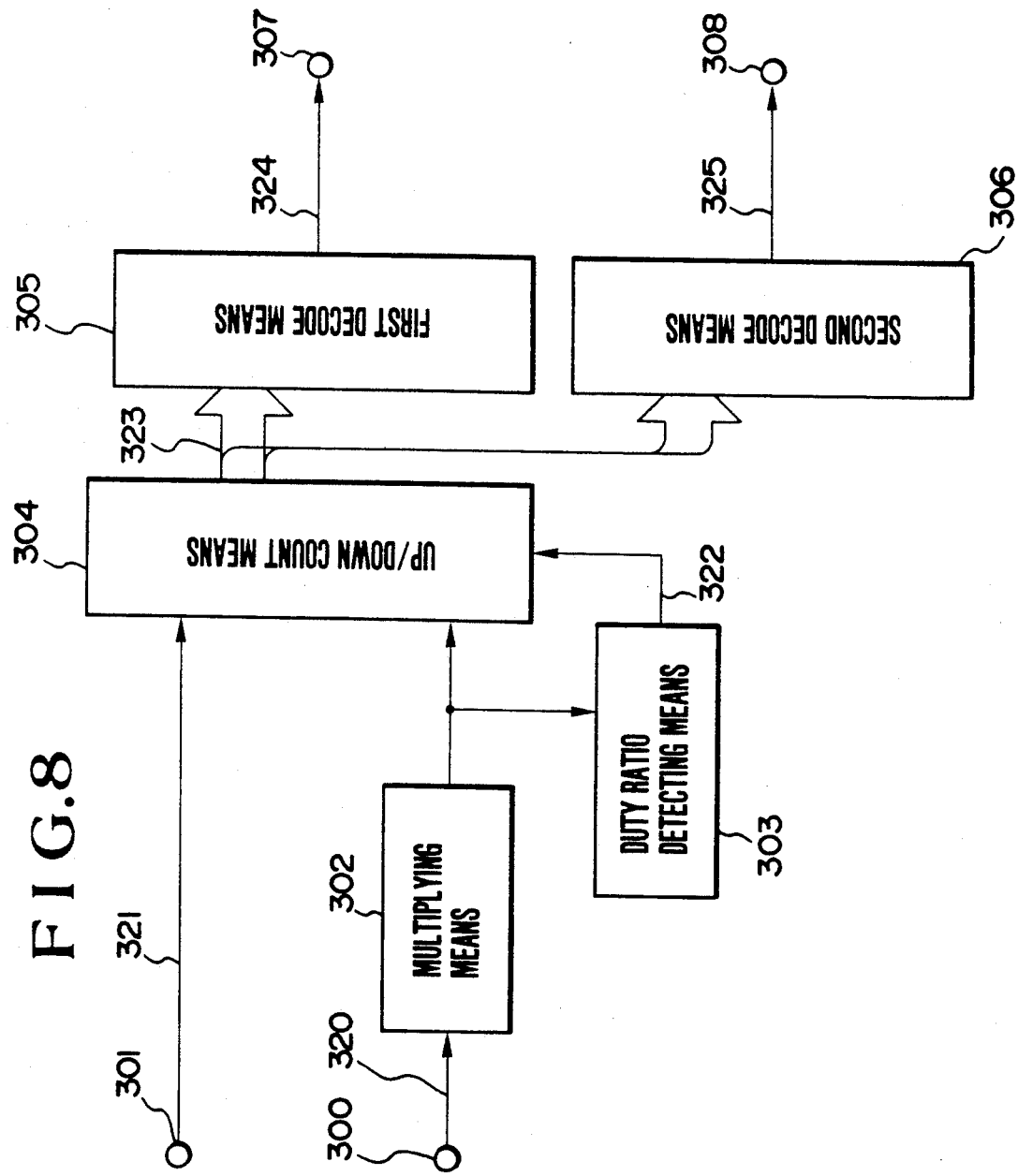
FIG. 8 is a block diagram of a second embodiment of a signal separator according to this invention.

FIG. 8 is a block diagram of the second embodiment of a signal separator of this invention. Shown at 300 is an input terminal to which a control signal 320 reproduced from the video tape is supplied. Shown at 301 is an input terminal to which a signal 321 indicating the direction of the video tape is supplied. Shown at 302 is multiplying means for multiplying the input control signal 320 by 2, and at 303 is duty ratio detecting means which generates a pulse when the duty ratio of the input control signal 320 is 6:4. Shown at 304 is up/down count means which counts the output signal from the multiplying means 302, is preset by the output signal 322 from the duty ratio detecting means 303 so that when the tape travel direction is positive (in the same direction as upon recording) it counts up and is set to preset value, {0} and that when the tape travel direction is negative (in the opposite direction to that during recording), it counts down and is set to {3} (hereinafter, the count 323 is represented by {number}), circulating through count {11}. Shown at 305 is a first decode circuit which produces a high level when the count 323 of the up/down count means 304 is {4, 5, 6, 10, 11, 0}, at 306 is a second decode circuit which produces a high level when the count 323 of the up/down count means 304 is {10, 11, 0, 1, 2, 3}, and at 307 is an output terminal at which the output signal 324 from the first decode means 305 is produced. Shown at 308 is an output terminal at which an output signal 325 from the second decode means 306 is produced.

The operation of the signal separator of this arrangement will be described below.

Figure 9:
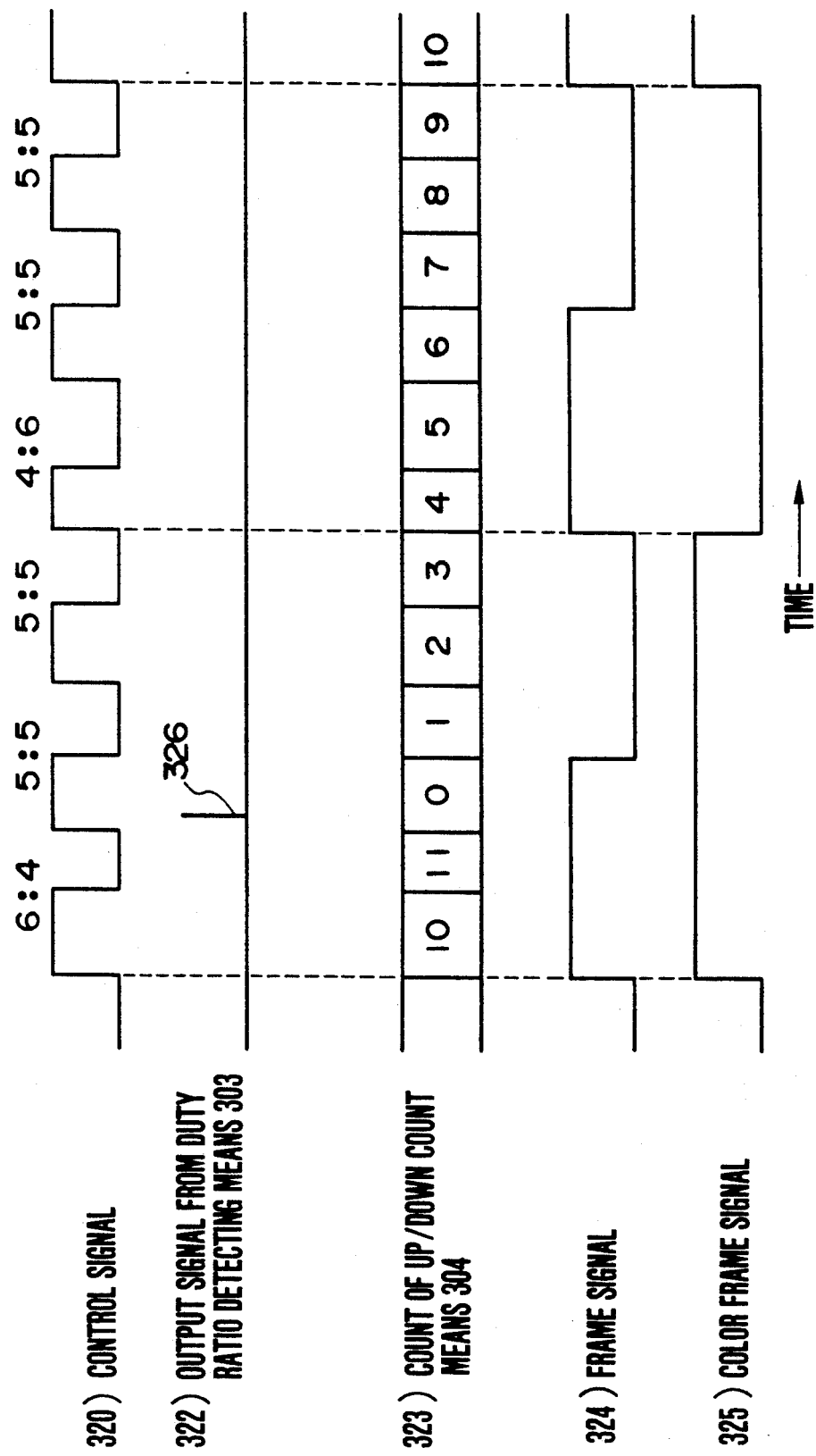
FIGS. 9 to 11 are timing charts showing the operation of this signal separator.

First, the operation of the signal separator in the case where the video tape travels in the positive direction (the same direction as that during recording) will be described with reference to the timing chart of FIG. 9. When the video tape travels in the positive direction, the control signal 320 of the waveform shown in FIG. 9 is reproduced. When the control signal 320 shown in FIG. 9 is supplied to the input terminal 300, the multiplying means 302 produces pulses at both edges of each pulse of the control signal 320. The duty ratio detecting means 303 detects the duty ratio of the input control signal 320, and produces the pulse 326 shown in FIG. 9 when the duty ratio is 6:4. The up/down count means 304 is preset to {0} by the pulse 326, and counts up at the output signal from the multiplying circuit 302, with the count 323 being changed as shown in FIG. 9. When the count 324 of the up/down count means 304 is {4, 5, 6, 10, 11, 0}, the first decode means 305 produces a high level. Thus, the frame signal 324 shown in FIG. 9 is produced at the output terminal 307. When the count 323 of the up/down count means 304 is {10, 11, 0, 1, 2, 3}, the second decode means 306 a high level. Thus, the color frame signal 325 shown in FIG. 9 is produced at output terminal 308.

Figure 10:
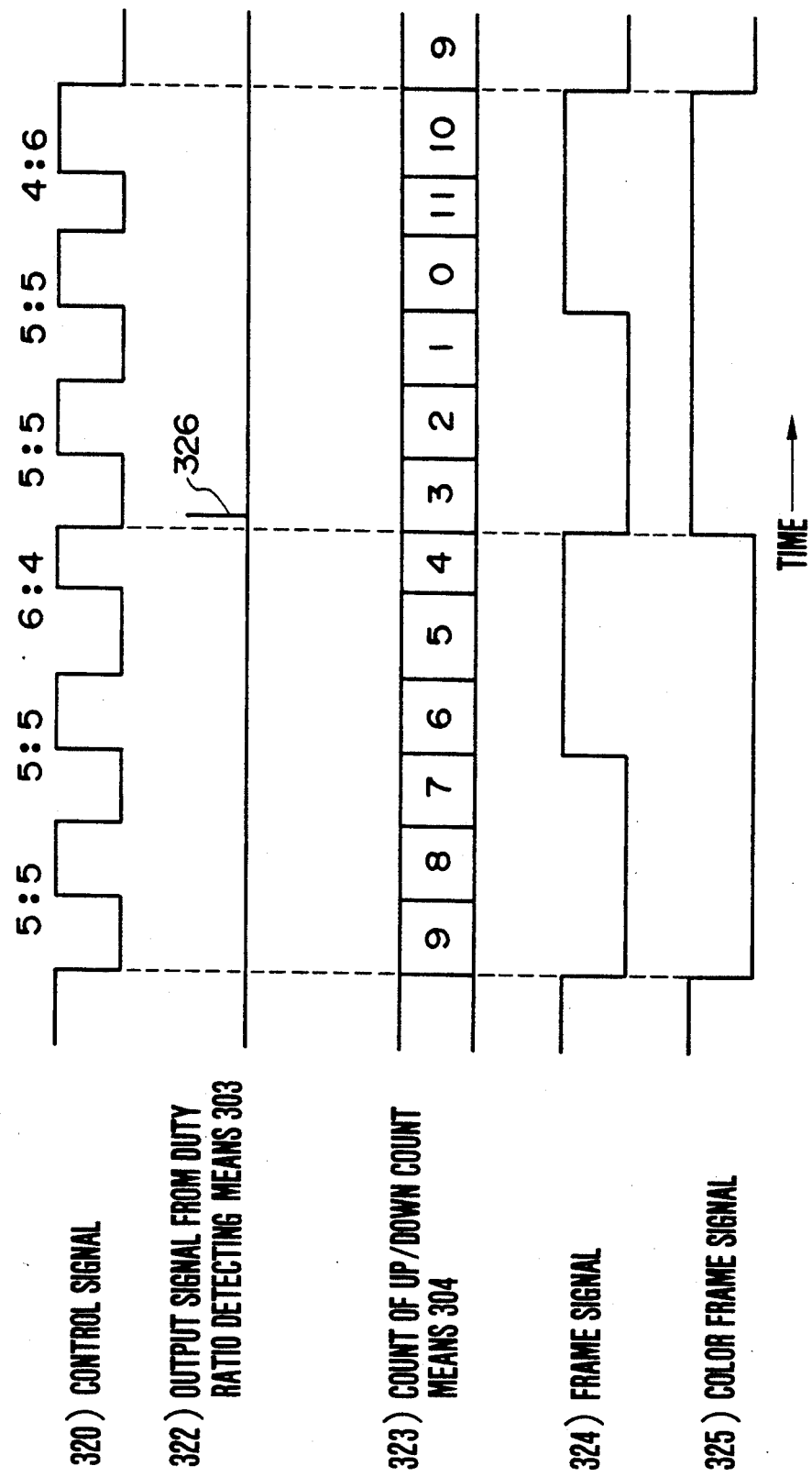

The operation of the signal separator in the case where the tape travel direction is negative will be described with the timing chart of FIG. 10. When the tape travel direction is negative, the control signal shown in FIG. 10 at 320 is reproduced and supplied to the input terminal 300. The operation in the case of the negative direction is different from that in the case of the positive direction in that the up/down count means 304 is preset to count {3} by the pulse 326 of the output signal 322 from the duty ratio detecting means 303, and counts down at the output signal from the multiplying means 302. Thus, as shown in FIG. 10, since the up/down count means 304 is preset to count {3} by the pulse 326 of the output signal 322 from the duty ratio detecting means 303 and counts down at the output signal from the multiplying means 302, the count 323 of the up/down count means 304 is as shown in FIG. 10. Thus, the first and second decode means 305, 306 produce the frame signal 324 shown in FIG. 10 at the output terminal 307 and the color frame signal 325 at the output terminal 308 shown in FIG. 10.

As will be obvious from FIGS. 9 and 10, if the tape travel direction is reversed to be positive or negative, the frame signal 324 and the color frame signal 325 are reversed relative to the time base as is the control signal 320.

Figure 11:
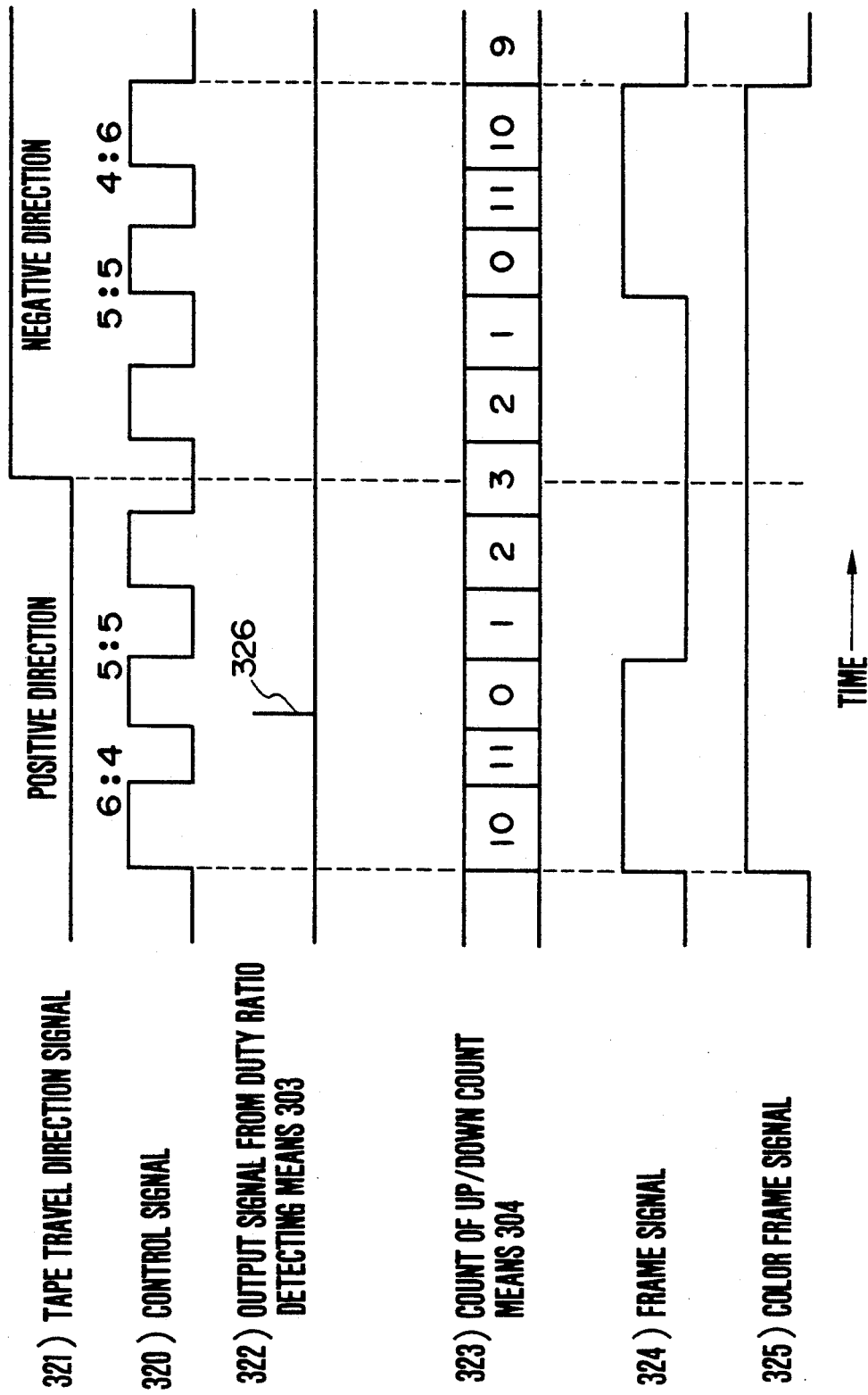

The operation at the point where the tape travel direction is changed will be mentioned with reference to the timing chart of FIG. 11. When the tape travel direction is changed from the positive to negative direction as shown in FIG. 11, the control signal 320 is reproduced as, for example, shown in FIG. 11 (though not shown, the duty ratio at the tape travel direction changing point is 5:5). When the tape travel direction is positive, the operation is the same as described above. When the tape travel direction is reversed to be negative, the direction in which the up/down count means 304 counts is switched from up-count to down-count, and thus the count 323 of the up/down count means 304 is as shown in FIG. 11. As will be obvious from FIG. 11, even when the tape travel direction is changed to be negative, the count 323 of the up/down count means 304 which counts the control signal is not disturbed. Since the frame signal 324 and the color frame signal 325 are produced by decoding the count 323 of the up/down count means 304, the frame signal 324 and the color frame signal 325 can be correctly produced.

The third embodiment of a signal separator of this invention will be described. In the third embodiment, the same effect can be obtained with a different arrangement from the second embodiment.

Figure 12:
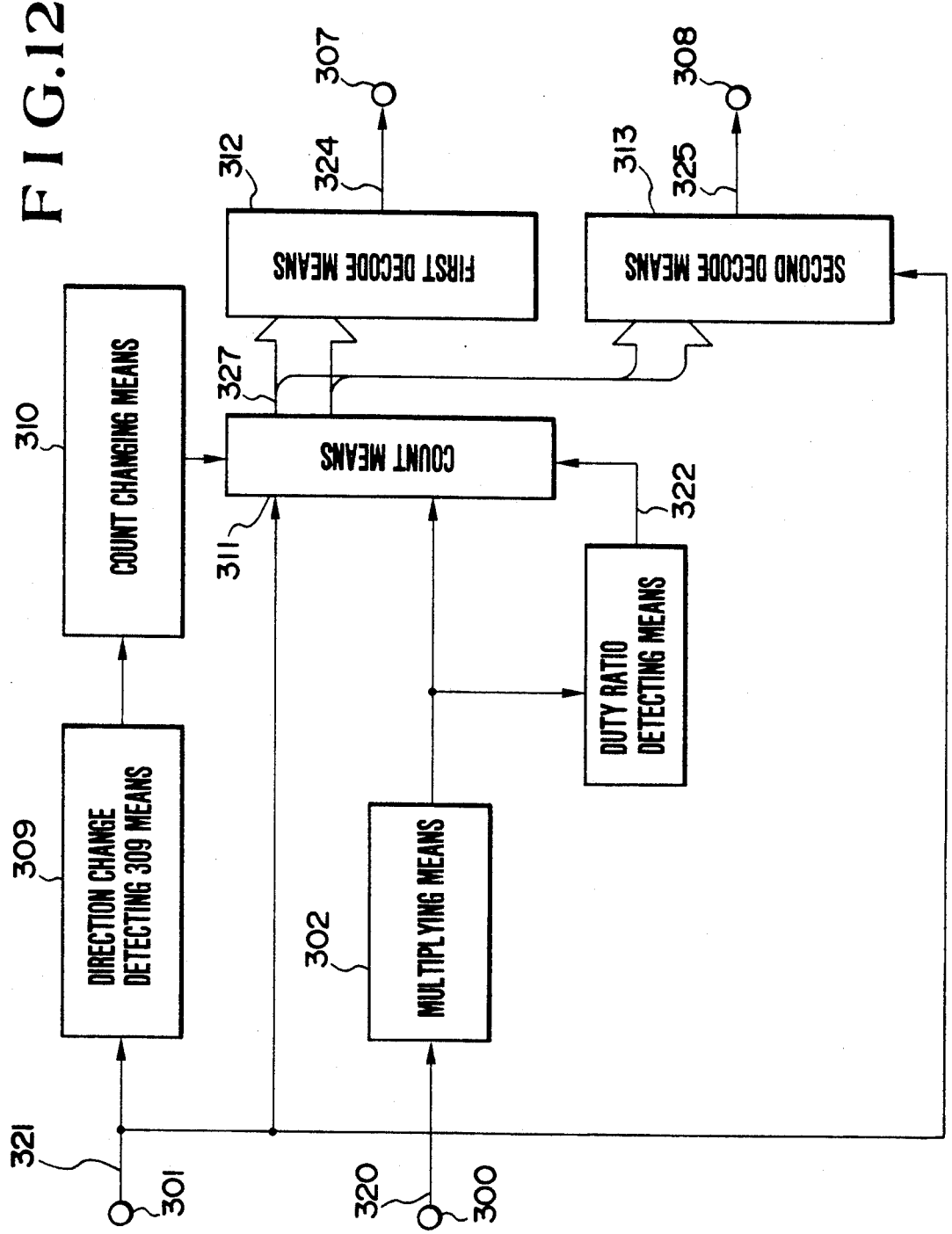
FIG. 12 is a block diagram of a third embodiment of a signal separator according to this invention.

FIG. 12 is a block diagram of the third embodiment of a signal separator of this invention. In FIG. 12, like elements corresponding to those in FIG. 8 are identified by the same reference numerals and will not be described. Shown at 311 is a count means which is preset by the pulse 326 of the output signal 322 from the duty ratio detecting means 303, counts up the output signal from the multiplying means 302, is preset to value {0} when the tape travel direction is positive and preset to {7} when the tape travel direction is negative, and circulates through count {11}. Shown at 309 is a direction change detecting means for detecting that the tape travel direction is changed, and at 310 is a count changing means which is responsive to the output signal from the direction change detecting means 309 to change the count 327 of the count means 311 at the time of the output signal from the multiplying means 302 in accordance with the rule expressed by the following equation (1):

$$y = 11 - x \quad (1)$$

where
x: the count before change
y: the count after change

Shown at 312 is a first decode means which produces a high level when the count 327 of the count means 311 is {4, 5, 6, 10, 11, 0}. Shown at 313 is a second decode means which produces high level when the count 327 of the count means 311 is {10, 11, 0, 1, 2, 3} under the positive tape travel direction and which produces high level when the count 327 of the count means 311 is {7, 8, 9, 10, 11, 0} under the negative tape travel direction.

The operation of the signal separator of this construction will be described below.

The waveform at each part when the tape travel direction is positive is shown in the timing chart of FIG. 13. When the tape travel direction is positive and is not changed, the direction change detecting means 309 and the count changing means 310 are not operated as in the first embodiment of the invention when the tape travel direction is positive. Thus, the waveform at each part is shown in the timing chart of FIG. 13 and will not be described.

The waveform at each part for negative tape travel direction is shown in the timing chart of FIG. 14. The operation in the case of negative tape travel direction is different from that in the case of positive tape travel direction in that the preset value of the count means 311 is {7}, and that a high level output is produced when the decoded value from the second decode means 313 is {7, 8, 10, 11, 0}. Since the other operations are the same as in the positive tape travel direction, the signal waveform at each part is shown in the timing chart of FIG. 14 and will not be described.

As will be obvious from FIGS. 13 and 14, if the tape travel direction is reversed positive or negative, the frame signal 324 and the color frame signal 325 are reversed relative to the time base as in the control signal.

The operation at the time when the tape travel direction is changed will be described with reference to the timing chart of FIG. 15. When the tape travel direction is changed from the positive to negative direction as shown in FIG. 15, the control signal 320 is reproduced as, for example, shown in FIG. 15 (though not shown, the duty ratio at the time of the change of the tape travel direction is 5:5). When the tape travel direction is positive, the operation is the same as above. When the tape travel direction is reversed negative, the direction change detection means 309 detects that the tape travel direction is reversed, and supplies a command to change the count to the count change means 310. The count change means 310 is responsive to the command from the direction change detection means 309 to change the count 327 of the count means 311 to {11−3=8} at the edge of the next direction-changed control signal (the timing at 328 in FIG. 15). Thereafter, the operation is the same as when the tape travels in the negative direction, and the count means 311 counts up at each edge of the control signal 320. The result is as shown in FIG. 15. Then, the first and second decode means 312, 313 decode the count 327 of the count means 311, so that the frame signal 324 and the color frame signal 325 are formed as shown in FIG. 15. As shown in FIG. 15, the frame signal 324 and the color frame signal 325 can be obtained correctly.

Since in the second and third embodiments of a signal separator of this invention, the duty ratio cannot be detected when the tape travel direction is reversed, the duty ratio detection means 303 is constructed so as not to detect the duty ratio when the tape travel direction is reversed as, for example, shown in the block diagram of FIG. 16. In FIG. 16, like elements corresponding to those in the second and third embodiments are identified by the same reference numerals and will not be described. Shown at 330 is a second count means which is reset when the direction change detecting means 309 detects the direction change, and then generates a pulse when it counts two output pulses from the multiplying means 302 after the resetting. Shown at 331 is an RS flip-flop (hereinafter, abbreviated RSFF) which is reset when the direction change detecting means 309 detects the direction change, and which is set by the output pulse from the second count means 330. Shown at 329 is an AND circuit for making the logical product between the output signal 322 from the duty ratio detecting mean 303 and the output signal from the RSFF 331. According to this arrangement, if a direction change occurs, the RSFF 331 is immediately reset by the direction change detecting means 309, and the output signal 322 from the duty ratio detecting means 309 is blocked by the AND circuit 329. Until the multiplying means 302 generates two pulses, the output signal 322 from the duty ratio detecting means 309 is blocked by the AND circuit 329. When the multiplying means 302 generates two pulses, the second count means 330 generates a pulse, setting the RSFF 331. As a result, the output signal 322 from the duty ratio detecting means 303 can be passed through the AND circuit 329. Thus, in the second and third embodiments of the signal separator, if the output signal 322 from the duty ratio detecting means 303 is changed into the output signal from the AND circuit 329, occurrence of a direction change will result in no detection of duty ratio during a constant period.

In the second and third embodiments of a signal separator of the invention, the duty ratio detecting means 303 detects only the position of the duty ratio 6:4. If another duty ratio detecting means is provided to detect the position of the duty ratio 4:6, the period in which the count means 304, 311 is preset is halved, and thus the frame signal 324 can be quickly detected, so that the pull-in time of the servo can be decreased.

Since the signal separator can be constructed by a microcomputer, the circuit scale can be reduced by sharing the microcomputer which has recently been used for the motor control in a video tape recorder.

If the first duty ratio of the control signal is selected to be 5:5, the second duty ratio to be M:L, and the third duty ratio to be L:M (L≠M≠5), then the duty ratio of the reproduced control signal even in the case of negative tape travel direction is the same as in the case of positive tape travel direction. Thus, the duty ratio to be detected need not change in accordance with the tape travel direction, making it possible to simplify the arrangement of the signal separator.

Moreover, the duty ratio of the control signal can be changed from 6:4, 4:6 in this embodiment to 7:3, 3:7 by a simple alteration of circuits.

Also, the position at which the duty ratio of the control signal is changed is not limited to that in this embodiment. If the duty ratio is changed at the position shown in FIG. 17, relative to the color frame signal 110, the beginning of the frame can be detected during a maximum of 3.5 times the period of the reference signal 111 (in the above embodiment, 5.5 times the period). Thus, the pull-in time of the servo can be minimized as compared with case in which the duty ratio at other position is changed. Also, if the duty ratio is changed at the position shown in FIG. 18 relative to the color frame signal 110, the positions at which the duty ratio is changed is the same for both the positive and negative tape travel direction. Accordingly, the signal separator can be simplified in construction. The position of the change of the control signal duty ratio is changed by altering the construction of the gate signal generating circuit 102 in the above embodiment.

Moreover, while in the above embodiments the reference signal 111 for the tape travel is recorded at three times the frequency of the frame signal, the reference signal 111 for the tape travel may be recorded at an integral number of times the frequency of the frame signal, such as four times or five times the frame frequency.

In addition, in the case of a video signal of a television system other than the NTSC system, for example, a PAL system video signal, the frame frequency is 25 Hz, the color frame frequency is 6.25 Hz, and a simple modification can be made for this invention. FIG. 19 shows some examples of the applications of the invention to the PAL system in which, for example, the frequency of the reference signal 111 is four times the frame signal. Shown at 400 in FIG. 19 is a waveform of the control signal of which the duty ratio is changed at every ½ the color frame period, and which corresponds to the above embodiments. Shown at 401 in FIG. 19 is a waveform of the control signal in which the duty ratio change occurs at every frame period so that the frame can be detected with a short period. Thus, the pull-in time of the servo can be shorted as compared with the waveform shown at 400 in FIG. 19. Shown at 402 in FIG. 19 is a waveform of the control signal in which the first position of the color frame can be detected by detecting the pulse of the duty ratio 6:4, thus the construction of the signal separator can be simple (in the waveform 401 shown in FIG. 19, there are two locations of duty ratio 6:4, and thus the correct color frame position cannot be detected by only detecting the pulse of duty ratio 6:4). Shown at 403 in FIG. 19 is a waveform of the control signal in which the maximum time in which the first position of the frame is detected is minimized as compared with the case in which the duty ratio at other positions is changed. Thus, the pull-in time of the servo can be reduced to a minimum. Shown at 404 in FIG. 19 is a waveform of the control signal in which the duty ratio change position of the reproduced control signal waveform relative to the color frame signal 110 is the same even for both positive and negative direction. Thus, the construction of the signal separator is simple.

We claim:

1. A control signal generator comprising:
    first signal forming means, in synchronization with a first reference signal applied thereto and having a predetermined frequency and a second reference signal applied thereto and having a frequency N times (N is a natural number larger than 2) higher than that of said first reference signal and having a first duty ratio, for forming a third signal which has a second duty ratio different from said first duty ratio;
    second signal forming means for forming a fourth signal which is synchronized with said second reference signal and has a third duty ratio different from said first and second duty ratios; and
    switching means which is supplied with said first and second reference signals and which produces said second reference signal, said third signal, and said fourth signal in a predetermined order, in a switching manner and in association with the period of said first reference signal.

2. A control signal generator according to claim 1, wherein said first duty ratio is 5:5, the second duty ratio M:L, and the third duty ratio is L:M (M≠L≠5).

3. A control signal generator according to claim 1, wherein said switching means produces only one period of said third signal and the remaining periods of said second reference signal during the first ½ period of said first reference signal, and produces only one period of said fourth signal and the remaining periods of said second reference signal during the second ½ period of said first reference signal.

4. A control signal generator according to claim 1, wherein said switching means produces only one period of said second reference signal and the remaining periods of said third signal or said fourth signal every ¼ period of said first reference signal.

5. A control signal generator according to claim 2, wherein said switching means produces one period of said third signal during the first ½ period of the first reference signal and one period of said fourth signal during the second ½ period at symmetrical positions in the period of the first reference signal, or produces one period of said fourth signal during the first ½ period and one period of said third signal during the second ½ period at symmetrical positions in the period of the first reference signal.

6. A control signal generator according to claim 3, wherein said switching means switches the first one period of said second reference signal to said third signal during the first ½ period of said first reference signal, and the first one period of said second reference signal to said fourth signal during the second ½ period.

7. A control signal generator according to claim 3, wherein said switching means switches the last one period of said second reference signal to said third signal during the first ½ period of said first reference signal, and the last one period of said second reference signal to said fourth signal during the second ½ period.

8. A control signal generator according to claim 4, wherein said switching means produces only one period of said third signal and the remaining period of said second reference signal during the first ¼ period of said first reference signal, only one period of said third signal and the remaining period of said second reference signal during the next ¼ period, only one period of said third signal and the remaining periods of said second reference signal during the still next ¼ period, and only one period of said fourth signal and the remaining periods of said second reference signal during the last ¼ period.

9. A control signal generator according to claim 4, wherein said switching means produces only one period of said third signal and the remaining periods of said second reference signal during the first ¼ period of said first reference signal, only one period of said third signal and the remaining periods of said second reference signal during the next ¼ period, only one period of said third signal and the remaining periods of said second reference signal during the still next ¼ period, and only one period of said fourth signal and the remaining periods of said second reference signal during the last next ¼ period.

10. A control signal generator according to claim 4, wherein said switching means switches the last one period of said second reference signal to said third signal or said fourth signal during each ¼ period of said first reference signal.

11. A signal separator comprising:
multiplying means for providing output pulses in accordance with a rising edge and a falling edge of a control signal;
duty ratio detecting means for detecting a predetermined duty ratio of said control signal;
up/down count means which counts said output pulses from said multiplying means, is preset by said output from said duty ratio detecting means and is controlled in counting direction and preset value by a tape travel direction; and
decode means for detecting that a count of said up/down means is a predetermined value.

12. A signal separator comprising:
multiplying means for providing output pulses in accordance with a rising edge and a falling edge of a control signal;
duty ratio detecting means for detecting a predetermined duty ratio of said control signal;
count means for counting said output pulses from said multiplying means, said count means being preset by an output signal from said duty ratio detecting so that a preset value is controlled in accordance with a traveling direction of a tape;
direction change detecting means for detecting a change in the traveling direction of the tape;
count changing means for changing the count of said count means in accordance with a certain value by an output from said direction change detecting means; and
decode means for detecting that the count of said count means is a certain value.

13. A signal separator according to claim 11, wherein said duty ratio detecting means is constructed to detect the duty ratio by using a signal having a frequency proportional to the tape travel speed.

14. A signal separator according to claim 11, wherein said duty ratio detecting means does not detect the duty ratio of the control signal when the tape travel direction is changed.

15. A signal separator according to claim 12, wherein said duty ratio detecting means does not detect the duty ratio of the control signal when the tape travel direction is changed.

16. A signal separator according to claim 12, wherein said predetermined count which said decode means detects is changed depending on the tape travel direction.

* * * * *